US007353765B1

(12) United States Patent
Feldman et al.

(10) Patent No.: US 7,353,765 B1
(45) Date of Patent: Apr. 8, 2008

(54) BOAT IGNITION SAFETY APPARATUS AND METHOD

(76) Inventors: Craig D. Feldman, 3612 Williamson Rd., Stow, OH (US) 44224-4032; Robert T. Allison, III, 4786 Bickford Ave., Akron, OH (US) 44319-4451; Russell A. Hercules, 419 Grove Ave., Cuyahoga Falls, OH (US) 44221-2246

( * ) Notice: Subject to any disclaimer, the term of this patent is extended or adjusted under 35 U.S.C. 154(b) by 0 days.

(21) Appl. No.: 11/489,859

(22) Filed: Jul. 20, 2006

Related U.S. Application Data

(63) Continuation-in-part of application No. 10/618,530, filed on Jul. 10, 2003, now abandoned.

(60) Provisional application No. 60/394,884, filed on Jul. 10, 2002, provisional application No. 09/950,032, filed on Sep. 10, 2001, provisional application No. 09/634,432, filed on Aug. 8, 2000, provisional application No. 60/147,797, filed on Aug. 9, 1999.

(51) Int. Cl.
*B63J 2/00* (2006.01)
*B60H 1/24* (2006.01)

(52) U.S. Cl. ..................................................... 114/211

(58) Field of Classification Search ................. 114/211
See application file for complete search history.

(56) References Cited

U.S. PATENT DOCUMENTS

| | | | | | |
|---|---|---|---|---|---|
| 3,292,568 | A * | 12/1966 | Morrell | 440/1 |
| 3,489,912 | A * | 1/1970 | Hoffman, Jr. | 307/9.1 |
| 4,134,112 | A * | 1/1979 | Kercheval et al. | 340/632 |
| 6,670,722 | B1 * | 12/2003 | Kessell et al. | 307/9.1 |
| 2004/0075342 | A1 * | 4/2004 | Feldman et al. | 307/10.1 |

* cited by examiner

*Primary Examiner*—Sherman Basinger
(74) *Attorney, Agent, or Firm*—Renner, Kenner, Greive, Bobak, Taylor & Weber

(57) ABSTRACT

A boat ignition safety apparatus comprises a safety control module having a vapor sensor to monitor the concentration to fuel vapors in an engine compartment of a boat. When the vapor sensor detects that the concentration of fumes has risen above a predetermined level, the safety control module, enables an alarm, while activating an exhaust fan. Somewhat simultaneously, the safety control module disables the starter circuit of the boat's engine, while still allowing the ignition circuit of the engine to remain active. As such, the operator of the boat is able to retain navigational control of the boat, while the alarm condition persists.

13 Claims, 16 Drawing Sheets

BOAT IGNITION SAFETY APPARATUS AND METHOD

CROSS-REFERENCE TO RELATED APPLICATION

The instant application is a continuation-in-part of U.S. patent application Ser. No. 10/618,530, filed on Jul. 10, 2003 now abandoned, which claims the benefit of U.S. Provisional Patent Application No. 60/394,884, which was filed on Jul. 10, 2002, and which claims the benefit of U.S. application Ser. No. 09/950,032, filed on Sep. 10, 2001, which claims the benefit of U.S. application Ser. No. 09/634,432, filed on Aug. 8, 2000, which claims the benefit of U.S. Provisional Application No. 60/147,797, filed on Aug. 9, 1999. The present invention is also the subject of Disclosure Document No. 455,716 dated Apr. 26, 1999, which was received by the U.S. Patent and Trademark Office on Apr. 30, 1999. The specification of each of the above-referenced applications is incorporated herein by reference.

TECHNICAL FIELD

Generally, the present invention relates to a boat ignition safety apparatus. Specifically, the present invention relates to a boat ignition safety apparatus that monitors the level of fuel vapor in an engine compartment or bilge of a boat or similar watercraft. More specifically, the present invention relates to a boat ignition safety apparatus that selectively enables and disables a starter circuit and/or an ignition circuit in response to certain fuel vapor levels detected by a vapor sensor.

BACKGROUND ART

Boats and other similar watercrafts are typically powered by inboard gasoline combustion engines that are mounted in an isolated engine compartment. The engine compartment serves to isolate the operational noise, and moving components associated with the operation of the inboard engine from the other areas of the boat occupied by passengers.

Prior to discussing the particular problems created by combustion engines, it is believed that a brief review of the basic components of a combustion engine is beneficial to the understanding of the concepts disclosed herein. Typically, combustion engines comprise a starting circuit and an ignition circuit. The ignition circuit typically comprises a voltage boosting coil, spark plugs, and a timing system, such as a distributor. The voltage boosting coil provides a high voltage, which is delivered to the spark plug in a timed manner so as to allow the engine to combust the gasoline provided in each of its cylinders. Thus, the ignition circuit is responsible for providing the necessary energy and timing to ignite the fuel delivered into the cylinders of the engine, so as to generate the continuous operation of the engine, thus allowing the engine to run. The starting circuit typically comprises a starter motor or solenoid that when energized, physically turns the primary mechanical components of the engine, allowing the ignition circuit to take over the combustion process, thus allowing the engine to be initially started. Thus, the starting circuit and the ignition circuit initially coact to start a cold or unstarted engine. However, once the engine is started, the starter circuit may be disabled, while ignition circuit takes over allowing the motor to run continuously.

Due to the nature of combustion engines and the fuel that powers them, volatile fuel vapors emanate from the engine when the boat is not in operation. In addition, the vapors or fumes also generated when the boat engine is idling, or is at low RPM (revolutions per minute). Due to the enclosed environment provided by the engine compartment, these fumes or vapor rapidly accumulate so as to reach a concentration substantial enough to become explosive or to ignite to create a fire. Because of the mechanical and electrical components utilized by the engine, the potential for the development of electrical sparks generated from the starter circuit, which draws high electrical current when operated, is a potential hazard.

In order to increase the safety of boats, many devices have been developed to evacuate the engine compartment of any volatile vapors, while replacing the evacuated fumes with fresh air. However, these devices typically operate by utilizing a timed blower or by disabling the ignition circuit of the engine. However, when the ignition circuit is disabled, the boat is no longer controllable by its operator. As such, the operator of the boat is unable to take any action to avoid another oncoming boat, barrier, or other object.

In addition, to prevent the accumulation of the volatile fumes, many boats utilize an exhaust fan or blower to ventilate the engine compartment. Furthermore, because there is a great potential for disaster, current federal regulations and safety operating guidelines suggest using a ventilation system for at least four minutes prior to starting the engine of the boat. Unfortunately, due to the many responsibilities and distractions encountered by boat operators, many fail to follow these guidelines or operate the exhaust blower to adequately ventilate the engine compartment.

Therefore, there is a need for a boat ignition safety apparatus that provides an initial sequence that occurs prior to an initial cold-start up that disables the ignition and the starter circuit for a predetermined period to time prior to starting the engine. In addition, there is a need for a boat safety ignition safety apparatus disables the starter and/or starter circuit if the amount of fuel vapor exceeds a predetermined level. Additionally, there is a need for an exhaust fan that removes fuel vapors from the engine compartment, for a predetermined period of time prior to starting the engine. Moreover, there is a need for a boat ignition safety apparatus that removes fuel vapors if the concentration of fuel vapor exceeds a predetermined level. Still yet there is a need for a boat ignition safety apparatus that provides an exhaust fan to remove fuel vapors from the engine compartment of a boat ignition safety apparatus that provides a convenience timer that allows an operator to immediately start the engine after it has been stopped, without performing the initial cold-start up sequence.

DISCLOSURE OF THE INVENTION

It is thus an object of the present invention to provide a boat ignition safety apparatus, which prevent volatile fuel vapors from concentrating to explosive levels in an engine compartment of a boat.

It is still another object of the present invention to provide a boat ignition safety apparatus, which selectively disables and enables an ignition circuit and/or a starter circuit when fuel vapors rise above a predetermined threshold.

These and other objects of the present invention, as well as the advantages thereof over existing prior art forms, which will become apparent from the description to follow, are accomplished by the improvements hereinafter described and claimed.

In general, a boat ignition safety apparatus for a boat having an engine mounted in an engine compartment, an ignition circuit to allow continuous operation of the engine, and a starter circuit to start the engine comprises a safety control module adapted to be coupled to the ignition circuit and the starter circuit. An exhaust fan is also coupled to said safety control module, and a vapor sensor is coupled to said safety control module. The vapor sensor is configured to be mounted within the engine compartment of the boat so as to detect fuel vapors. The said safety control module disables the starter circuit of the engine and enables said exhaust fan when the concentration of fuel vapors detected by said vapor sensor exceeds a predetermined threshold, while the safety control module maintains the operation of the ignition circuit of the engine, if the engine was operating at the time said predetermined threshold was exceeded.

In accordance with another aspect of the present invention, a method for detecting fuel vapor in an engine compartment of a boat, the engine compartment maintaining an engine having an ignition circuit and a starter circuit, the method comprising, determining whether the concentration of fuel vapor in the engine compartment is above a predetermined threshold value. Next, enabling an exhaust fan and disabling the starter circuit if the concentration of fuel vapor exceeds said predetermined threshold value. And enabling the starter circuit after the concentration of fuel vapor has fallen below said predetermined threshold.

In yet another aspect of the present invention, a method for detecting fuel vapor in an engine compartment of a boat maintaining an engine comprising, placing an ignition switch into its ON position. Disabling a starter circuit, and an ignition circuit for a predetermined period of time. Determining whether said predetermined period of time has expired. Determining whether the fuel vapor concentration in the engine compartment exceeds a predetermined level once said predetermined period of time has expired. And enabling said starter circuit, and said ignition circuit if at said second determining step said fuel vapors do not exceed said predetermined level.

A preferred exemplary boat ignition safety apparatus incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
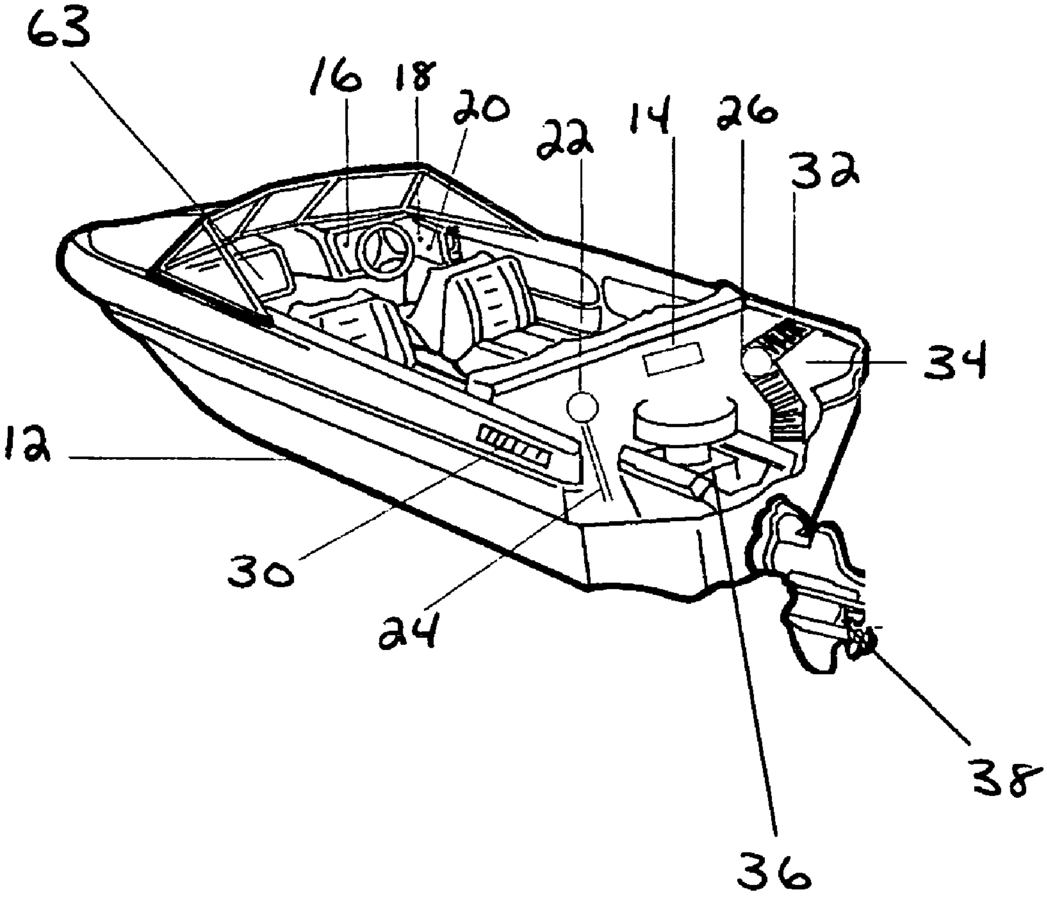
FIG. 1 is a perspective view of a boat equipped with the boat ignition safety apparatus of the present invention with the engine compartment shown partially cut-away.

A boat ignition safety apparatus is generally referred to by the numeral 10 as shown in FIG. 1 of the drawings. The safety apparatus 10 comprises several components that are mounted in various locations on a boat 12. Specifically, the safety apparatus 10 comprises a control module 14, that communicates with a run indicator lamp 16, a bypass switch 18, a starter switch 20, an exhaust or ventilation fan 22, a sensing tube 24, and an air pressure sensing switch 26. The emergency bypass switch 18 allows a boat operator to immediately start the engine of the boat in a manner to be discussed. In addition to the components of the safety apparatus 10, the boat 12 includes an air inlet duct 30, and an exhaust duct 32 situated in a bilge or engine compartment 34 where an engine 36 is mounted so as to drive a propulsion unit 38, such as a propeller or impeller for example. Thus, as the boat 12 is moved through the water by the propulsion unit 38, fresh air is moved into the engine compartment 34 via the air inlet duct 30, and exhausted out of the engine compartment 34 via the exhaust ducting 32. The engine 36 comprises a gasoline combustion engine, but may comprise any other type of engine the utilizes hydrocarbon-based fuel. Typically, during operation of the boat 12, the engine compartment 34 is covered by a cover (not shown) so that the engine 36 is effectively sealed or cordoned off from the remaining portions of the boat 12. The run indicator 16 is configured to illuminate when the engine 36 is running. Additionally, the air pressure sensing switch 26 monitors the flow of air via an airflow sensing tube 24 to ensure that clean, fresh air is moving through the engine compartment 34. Thus, when the exhaust fan 22 is operating, any fumes that collect in the engine compartment 34 may be removed to a safe level in a manner to be discussed below.

During operation of the safety apparatus 10, the air pressure sensing switch 26 monitors the flow of air through the engine compartment 34 via an airflow sensing tube 24 to ensure that fresh air is being circulated through the engine compartment 34. Once the air pressure sensing switch 26 determines that fresh air is entering the engine compartment 34, the control module 14 performs certain actions which will be discussed with reference to FIG. 2 below.

Figure 2:
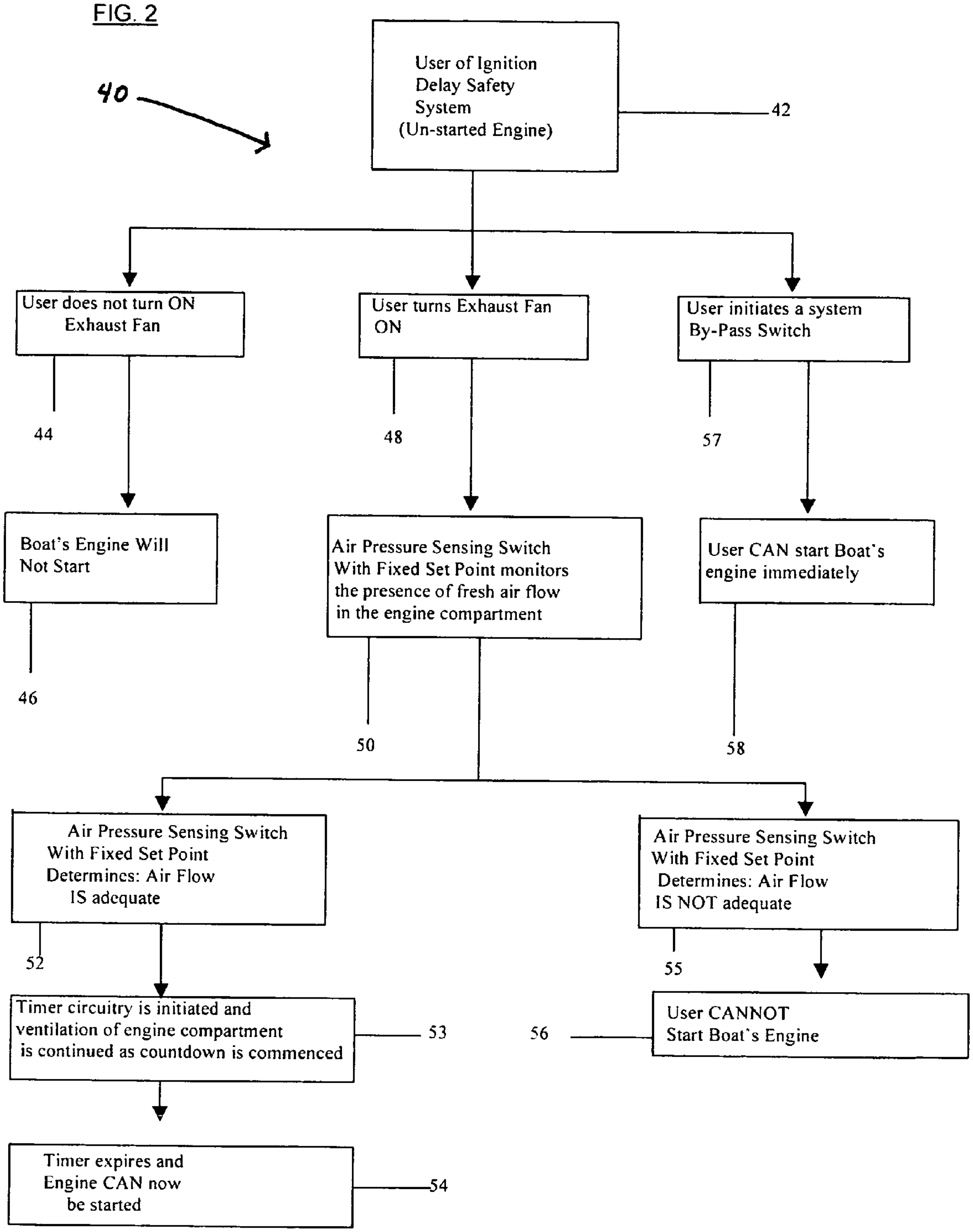
FIG. 2 is a block diagram of the general functionality of the boat ignition safety apparatus.
Figure 3:
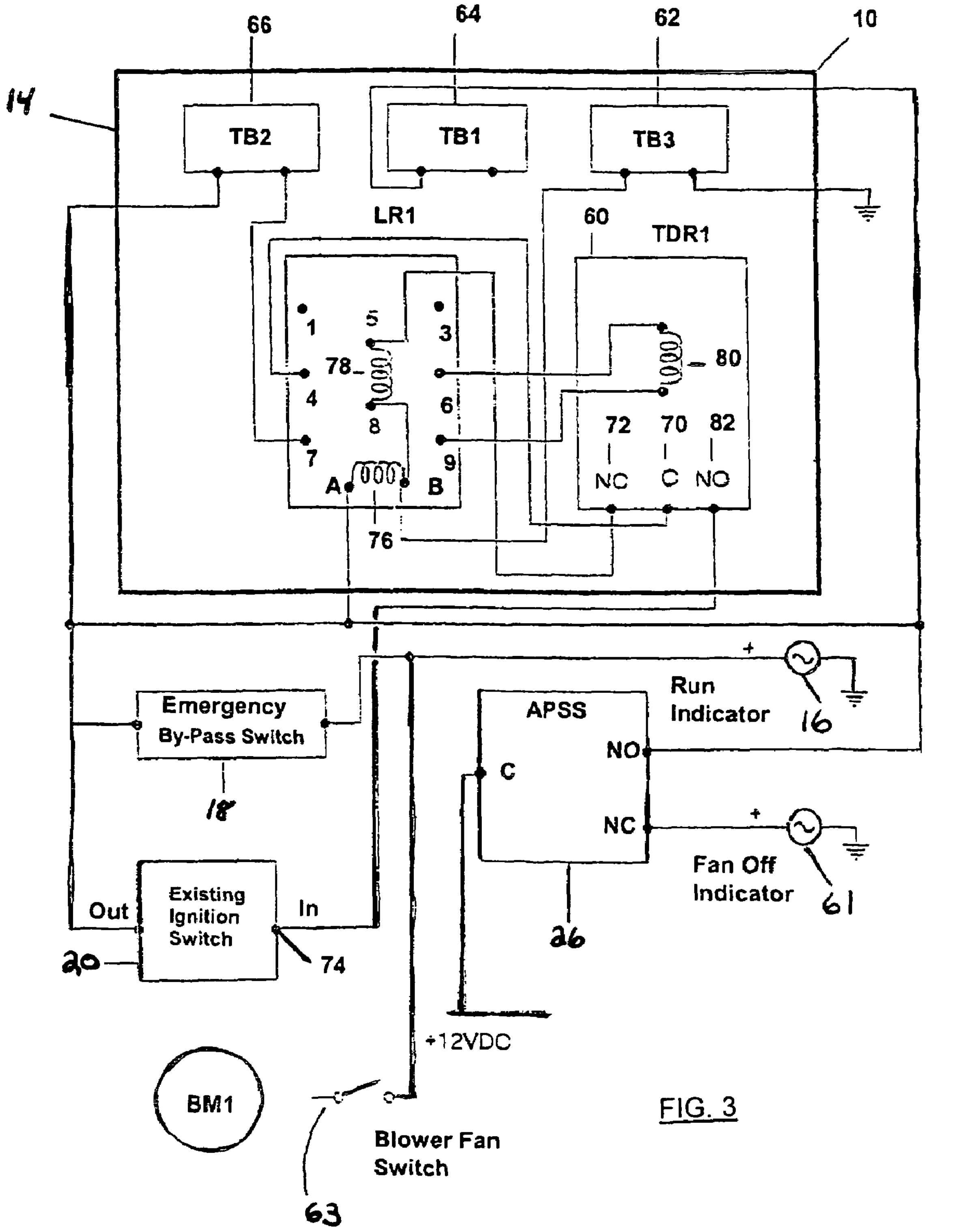
FIG. 3 is a schematic diagram of the boat ignition safety apparatus of the present invention.
Figure 4:
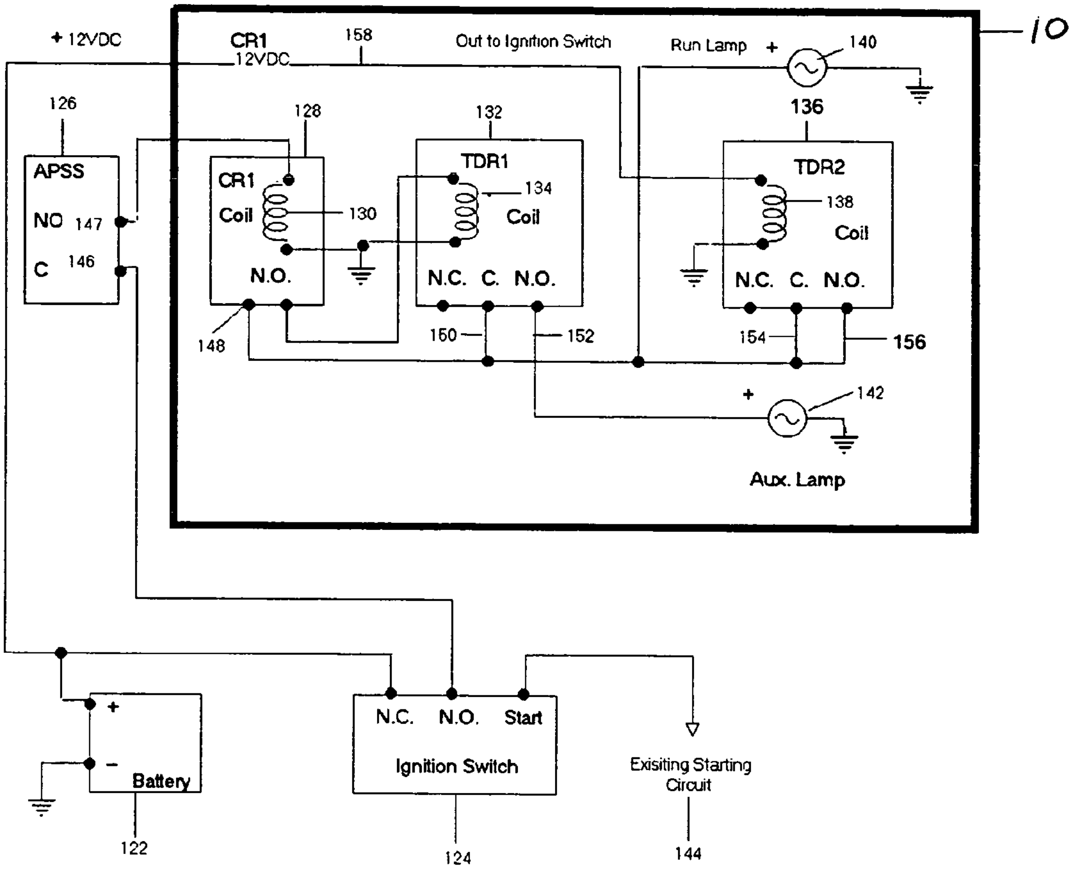
FIG. 4 is a schematic diagram of an alternate embodiment of the boat ignition safety apparatus.
Figure 5:
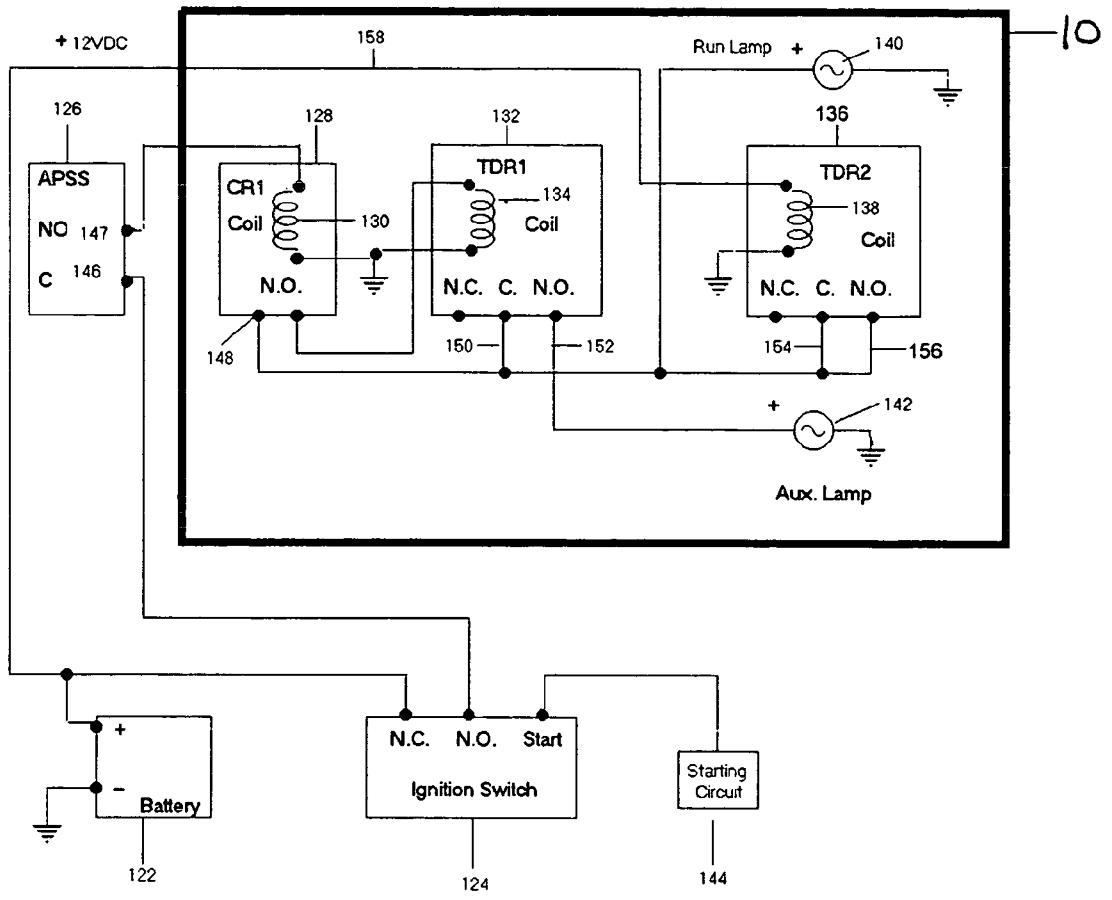
FIG. 5 is a schematic diagram of the embodiment in FIG. 4 showing internal and external wiring connections for the present invention.

The operational steps taken by a boat ignition safety apparatus 10, are generally referred to by the numeral 40, shown in FIG. 2 of the drawings. Initially, at step 42, the engine 36 of the boat 12 is initially cold or otherwise unstarted, and as such, the boat operator is presented with several courses of action. If the boat operator proceeds to step 44, and does turn on the exhaust fan 22, then the engine 36 is prevented from starting, and the exhaust fan 22 is automatically activated as indicated at step 46. However, if at step 48 the boat operator does turn on the exhaust fan 22 or if the exhaust fan 22 is automatically turned on as previously discussed at step 46, then the process 40 continues to step 50. At step 50, the air pressure sensing switch, or air pressure sensor 26 is activated and begins to monitor the presence of positive air pressure in the engine compartment 34. The air pressure sensor 26 as indicated at step 50 determines whether the exhaust fan 22 is clearing the engine compartment 34 of volatile gasoline fumes. In fact, FIGS. 3-5 schematically shows various embodiments of the boat ignition safety apparatus 10, and the associated air pressure sensors 26 used therewith. One of ordinary skill in the art would also appreciate that separate air pressure sensors and switches could separately be used to comprise the air pressure sensing switch 26 that integrates both sensing and switching functions. It should also be appreciated that in one embodiment the air pressure sensing switch 26 may comprise an air pressure sensing switch Model RSS-495-11 sold by Cleveland Controls.

Briefly, the air pressure sensing switch 26 may be comprised of a housing containing a diaphragm and a snap-acting switch (not shown). Barbed sample-line connectors on each side of the diaphragm accept flexible tubing. The snap-action switch can be actuated by a positive or negative pressure, or by a pressure differential. The switch includes normally open, normally closed and common connect terminals. The air pressure sensing switch 26 has an adjustable set point range that is set to a predetermined set point for use in the present invention. In the boat ignition safety apparatus 10 of the present invention, the air pressure sensor, implemented as the air pressure sensing switch 26, is configured to detect positive pressure within the engine compartment 34. When fresh air is drawn into an engine compartment 34 by the ventilation fan 22 in order to evacuate any fumes out from the engine compartment 34, a positive air pressure develops within the engine compartment 34. This positive pressure is detected by the air pressure sensing switch 26, thus indicating that the ventilation fan 22 is operating properly.

Use of the air pressure sensing switch 26 in the present invention provides a number of advantages over prior art boat ignition safety devices. In particular, prior art boat ignition safety devices were adversely affected by the direction of air flow, the devices orientation and forces applied to the prior art devices due to acceleration and deceleration. Because the present invention includes an air pressure sensing switch it can detect air pressure from all directions. Prior art devices use a sail and cam arrangement that will only trigger a separate switch if air flows in one direction to push the sail and cam into the switch.

Another advantage provided by the use of an air pressure sensing switch is that it can be mounted within the boat in almost any orientation, making the boat ignition safety apparatus easily adaptable to different types of boats. Prior art devices, such as that disclosed in U.S. Pat. No. 5,050,520, will only detect air flow if the mechanical sensory device, made up of a sail, cam and switch, are within a horizontally mounted vent tube. If the vent tube where mounted vertically with the intake side of the vent tube upward, the position of the sail changes and triggers the switch. If the intake side of the tube were mounted vertically with the intake side of the tube downward, the position of the sail changes away from the switch and never triggers the switch. The prior art devices requires that the vent tube always be positioned so that air flow works the sail properly. The use of an air pressure sensing switch in the present invention does not depend on a sail, cam and switch arrangement, only the detection of positive air pressure. Therefore, the air pressure sensing switch can be mounted in any position, making the device much more convenient to mount and/or retrofit in boats.

A further advantage of the use of an air pressure sensing switch in the present invention is that it is unaffected by forces due to acceleration and deceleration of the boat. Because the prior art devices use a mechanical sensory device, i.e., a sail, cam and switch, they have mass, which a sudden force from acceleration or deceleration could activate due to inertia. For example, if a boat were to slam into a wave or surf down the face of a wave, this motion would cause a change in the position of the sail and thereby detect forces of acceleration rather than air flow. Because the present invention monitors and detects air pressure, the detection method has little mass and forces due to acceleration and deceleration do not affect the results.

Returning to step 50 of the process 40 shown in FIG. 2, if adequate flow of air is detected within the engine compartment 34 at step 52, thus verifying that the exhaust fan 22 is operating properly, then the process proceeds to step 53. At step 53, a predetermined time delay is started, during which the exhaust fan 22 maintains the flow of fresh air through the engine compartment 34. Additionally, during the time delay, the engine 36 of the boat 12 is disabled and may not be started. Once the time delay expires, the safety apparatus 10 allows the engine 36 to be started, as indicated at step 54.

However, if at step 50, the air pressure sensing switch 26 determines that the air flow is not adequate to remove the fuel fumes from the engine compartment 34, as indicated at step 55, then the process continues to step 56. At step 56 the engine is disabled, thus preventing the operator of the boat from starting it. Unless the air pressure sensing switch 26 detects adequate air flow for the duration of the predetermined time delay, the engine 36 will not be allowed to be started. For example, if half-way through the predetermined time delay, the air pressure sensing switch 26 no longer detects positive air pressure in the engine compartment 34, the predetermined time delay will be reset and started over upon the next detection of positive air pressure by the air pressure sensing switch 26.

Returning back to step 42, where the engine 36 is unstarted or cold, the process 40 also provides a by-pass procedure in emergency circumstances. In order to activate the by-pass, the operator actuates the by-pass switch 18, as indicated at step 57. By activating the by-pass switch 18, the boat operator can immediately start the engine 36 of the boat 12 via the ignition switch 20, as indicated at step 58. As such, the emergency by-pass switch 18 allows the user to avoid a collision with another boat or other source of imminent danger. To provide additional safety, the emergency by-pass sequence discussed above may be modified so that the exhaust fan 22 is automatically started or remains operating upon actuation of the by-pass switch 18.

However, because the emergency by-pass switch 18 enables a boat operator to circumvent the safety features provided by the boat ignition safety apparatus 10, an additional embodiment of the safety apparatus 10 is contemplated. In this embodiment the by-pass switch 18 includes a time limitation on its use. Thus, when the by-pass switch 18 has been engaged, the engine 36 is only permitted to operate for a predetermined time period sufficient to allow the operator to navigate the boat 12 out of the path of danger.

FIG. 3 is a schematic diagram of the boat ignition safety apparatus 10. To place the safety apparatus 10 into operation, the ignition switch 52 of the boat ignition safety apparatus 10 is actuated, as such, +12 VDC 46 is applied to terminal block 2 (TB2) 66, terminal 7 of latching relay 1 (LR1) 58 and to a fan off indicator lamp 61. Instead of an ignition switch 20, the safety apparatus 10 could include a sensor that detects when a preexisting ignition switch or actuator of a boat 12 is initiated. This sequence of events has the effect of preventing the engine 36 from being started until air flow has been proven to be adequate at air pressure sensor 26. To initiate the boat ignition safety apparatus 10 and to start the boat 12, the boat operator is required to actuate an exhaust blower fan switch 63, which engages the blower motor BM1. It should be appreciated that the blower motor BM1 and the ventilation fan 22 as discussed herein are equivalent, and as such, one may be substituted for the other.

In an alternate embodiment of the safety apparatus 10, the safety apparatus 10 detects the actuation of the ignition switch 20 and automatically engages blower motor BM1. The blower motor BM1 provides positive air flow and a positive air pressure within the engine compartment 34, which is detected by the air pressure sensing switch 26, thus causing the contacts of the air pressure sensing switch 26 to close and the fan indicator lamp 61 to turn off. When the contacts of the air pressure sensing switch 26 close, +12 VDC is applied to both terminal block 1 (TB1) 64 and terminal A 76 of the latching relay 65. Furthermore, terminals 4 and 7 of the latching relay 65 close applying +12 VDC to the time delay relay (TDR1) 60, common node 70, normally open terminal 82 and terminal 8 of latching relay 65, which activates coil 78. Activating coil 78 has the effect of closing terminals 6 and 9 of latching relay 65, which activates 9 coil 80 of time delay relay 60 and initiates the preset four (4) minute time delay of the apparatus 10. However, it should be appreciated that the time delay may comprise any desired time period. The relay logic, or combination of latching relays and time delay relays, is primarily responsible for controlling the functions of the boat ignition safety apparatus 10. In order to complete the preset four (4) minute timing cycle, the air pressure sensing switch 26 must detect positive air flow in the form of positive air pressure for the full timing cycle otherwise the sequence is repeated until positive air flow is detected for the entire timing cycle.

Once the preset four (4) minute timing cycle is completed, time delay relay 60 opens normally closed terminal 72 and closes normally open contact 82. Next, +12 VDC is applied to terminal 74 of ignition switch 52 and illuminates run indicator lamp 16 thereby allowing the engine 36 to be started. Once the engine 36 has been started and is running, the blower fan switch 63 can be turned off allowing the engine 36 to continue normal operation until the ignition switch 20 is turned off. Once the ignition switch 20 is turned to the off position, the above sequence must be repeated in order to restart the engine 36. As a further safety measure, the emergency bypass switch 18 has been provided to give the boat operator the ability to circumvent the boat ignition safety apparatus 10 in the event of an emergency. This allows the user of the safety apparatus 10 to immediately start the boat's engine 36 to avoid potential danger, such as a head on collision for example. Additionally, in one example embodiment, when the bypass switch 18 is activated the blower motor BM1 is automatically started.

FIG. 4 shows a schematic diagram of an alternate embodiment of the boat ignition safety apparatus 10. When an ignition switch 124 is initially activated, the +12 VDC power source, such as a battery 122, is applied to the common contact C 146 of the air pressure sensing switch (APSS) 126. The ignition switch 124 and the existing boat's starting circuit 144 are then interrupted until the user activates the engine compartment exhaust fan 22. In an alternate embodiment, apparatus 10 automatically engages the exhaust fan 22 when the ignition switch 124 is initially activated. When the exhaust fan 22 is activated, +12 VDC is applied from the battery 122 to the air pressure sensing switch 126, causing common contact C 146, and normally open contact NO 147 of the air pressure sensing switch 126 to close. The closing of common contact C 146 and normally open contact NO 147 results in +12 VDC from the battery 122 being applied to the coil 130 of the control relay (CR 1) 128. As a result, control relay 128 closes normally open NO contact 148 and applies +12 VDC 122 to time delay relay (TDR2) 136 and common contact C 150 of time delay relay (TDR1) 132. Time delay relays 132 and 136 initiate the timing cycle, which in a preferred embodiment is approximately four (4) minutes, however any other time period may be utilized. When the timing cycle is completed, time delay relay (TDR1) 132 closes common contact C 150 and normally open contact NO 152. Time delay relay (TDR2) 136 closes common contact C 154 and normally open contact NO 156, which applies +12 VDC 122 to the run lamp 140, the ignition return path 158, and to the starting circuit 144, thereby allowing the engine to resume normal operation. Finally, the run lamp 140 is contained within the control module 14 and the auxiliary light 142 terminals are provided for external connection to the control module 14.

FIG. 5 is a schematic diagram of another embodiment of the boat ignition safety apparatus 10. During operation of the safety apparatus 10, when the ignition switch 124 is activated, the power source 122 applies +12 VDC to common contact C 146 of the air pressure sensing switch (APSS) 126. The ignition switch 124 and the starting circuit 144 are then interrupted until the user activates the exhaust fan 22. Once the boat operator initiates the exhaust fan 22, the +12 VDC power source 122 is applied to the air pressure sensing switch 126, which causes the common contact C 146 and the +12 VDC power source 122 to be applied to the coil 130 in control module (CR1) 128. As a result, the control module (CR1) 128 closes normally open contacts NO 148, and applies the +12 VDC power source 122 to the time delay relay (TDR2) 136 and common contact C 150 of time delay relay (TDR1) 132. Time delay relays 132 and 136 initiate the timing cycle, which may be approximately four (4) minutes in duration, however any other time period may be utilized. When the timing cycle is completed, the time delay relay (TDR1) 132 closes common contact C 150 and normally open contact NO 152. Time delay relay 136 closes common contact C 154 and normally open contact NO 156, which applies the +12 VDC power source 122 to the run lamp 140 and to the starting circuit 144. This in turn allows the boat engine 36 to resume normal operation. Finally, the run light 140 is contained within the control module 14, shown in FIG. 1 and the auxiliary light 142 terminals are provided for external connection to the control module 14.

Figure 6:
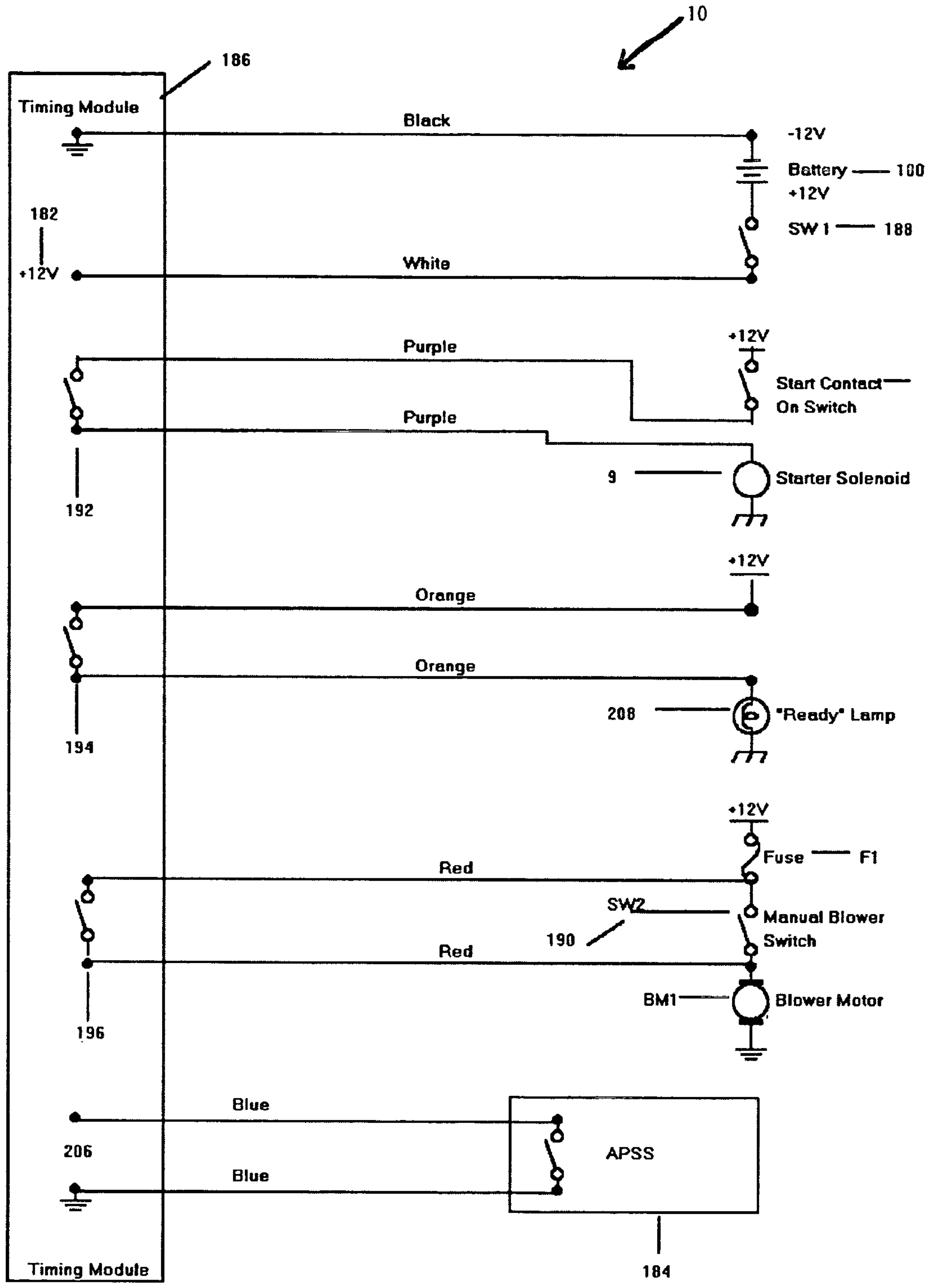
FIG. 6 is a schematic diagram of an alternate embodiment of the boat ignition safety apparatus.

FIG. 6 refers to another embodiment of the boat ignition safety apparatus 10, whereby a timing module 186, that controls the functions provided by the boat ignition safety apparatus 10 is utilized. The timing module 186 typically comprises a plurality of switches, which may be comprised of electro-mechanical relay logic, solid state and digital switches, or microprocessor or microcontroller circuitry or any other suitable type of switch. The use of digitally programmable control devices for the timing module 186 allows for advanced monitoring of air flow, reprogrammable time delays, and more versatile control of the engine 36. A person of ordinary skill in electronics would know that there are many ways to implement the control functions of the present invention and would be able to do so based upon the descriptions set forth herein.

FIG. 6 discloses the functions of the boat ignition safety apparatus 10 in which the timing module 186 is utilized to coordinate the performance of various functions to be described. When the timing module 186 is actuated, it receives +12 VDC power source 182 via a switch (SW1) 188, and a battery 180. This causes internal switches 192 and 194 to open, and internal switch 196 to close. Thus, disabling the boat ignition and starter circuits. Internal switch 196 starts the boat ventilation/exhaust fan 22 or blower motor BM1. The blower motor BM1 provides air flow in the engine compartment 34, while also creating positive air pressure within the engine compartment 34. When the air pressure sensing switch 184 detects positive air pressure, it opens its contacts. The air pressure sensing switch 184 also removes the ground from the internal connection 206 and starts the timing cycle. The timing cycle will continue for approximately four (4) minutes or any other predetermined time period for which the apparatus has been configured.

If the boat operator fails to turn on the manual blower switch SW2 190 before the timing cycle completes, and the blower motor BM1 stops, which in turn allows the positive air pressure within the engine compartment 34 to dissipate. The air pressure sensing switch 184 detects the change in air pressure and opens its contacts preventing the boat engine 36 from starting. The timing cycle must be reset by turning off switch SW1 188 or by turning on the manual blower switch SW2 190.

When the timing cycle is reset and the blower motor BM1 is turned on by the operator of the boat, the timing cycle will continue to run for four (4) minutes plus or minus three (3) seconds, although any other time period could be used. When the timing cycle is completed and the ready lamp 208 is illuminated, the boat ignition and starter circuits are enabled and the engine may be started. When running, the blower motor BM1 may be turned on and off manually as needed.

Additionally, the boat operator also has the option in an emergency to by-pass the timing module 186 by activating an emergency by-pass switch (not shown) allowing the boat engine 36 to be started immediately.

Figure 7:
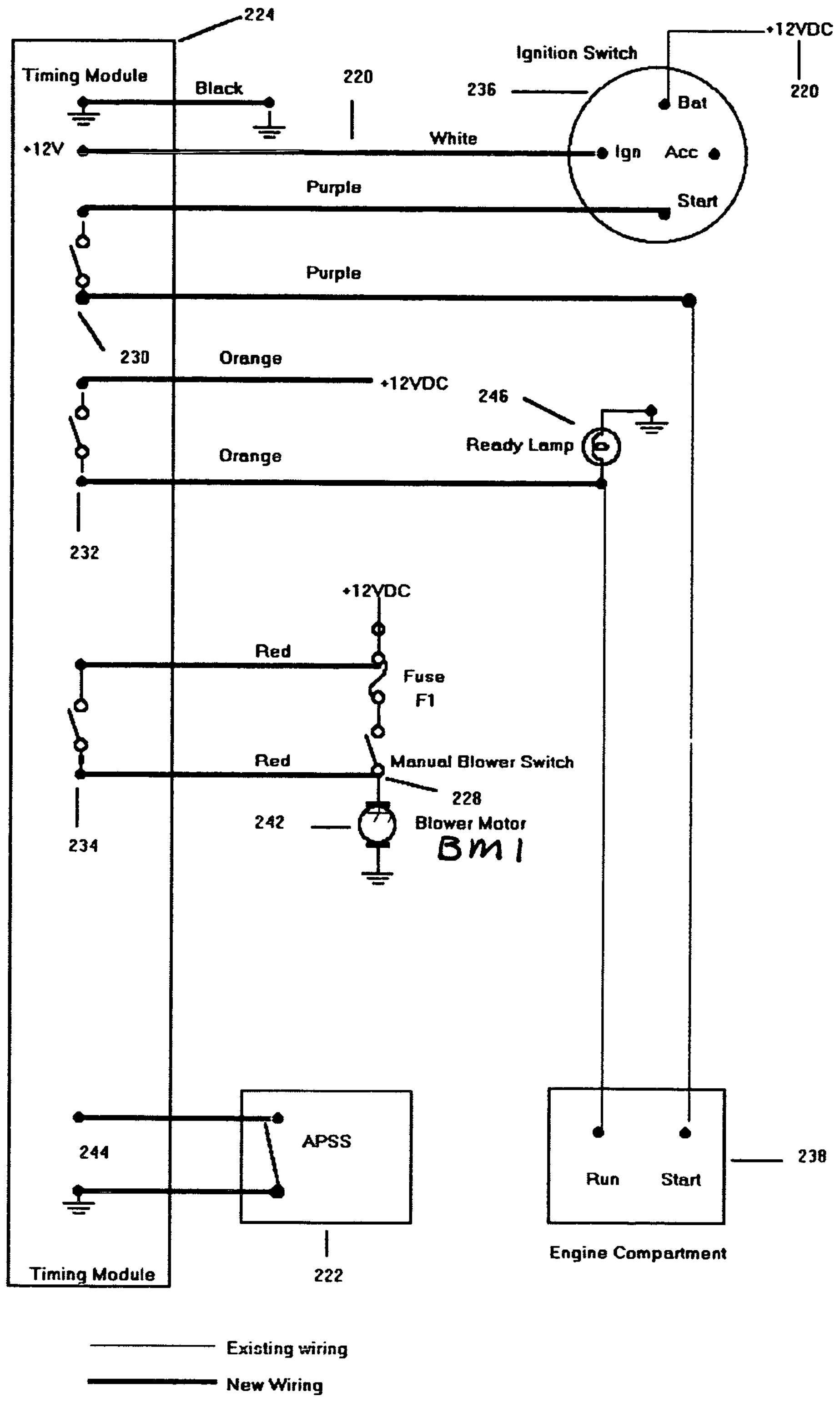
FIG. 7 is a schematic diagram of an alternate embodiment of the boat ignition safety apparatus.

FIG. 7 is a schematic diagram of another embodiment of the boat ignition safety apparatus 10. In this embodiment, the boat ignition safety apparatus 10 comprises a timing module 224, that when actuated, receives +12 VDC power 220 that is supplied via a boat ignition switch 236. This causes internal switches 230 and 232 to open, and internal switch 234 to close, thus disabling the boat ignition and starter circuits 238. Internal switch 234 starts the boat blower motor BM1, which creates positive air pressure within the engine compartment 34, which is detected by the air pressure sensing switch (APSS) 222. As a result, the air pressure sensing switch 222 contacts open removing the ground connection 244, thereby starting the four (4) minute timing cycle, although any other time period could be used.

If the boat operator fails to turn on the manual blower switch 228 before the timing cycle completes, the blower motor BM1 stops, causing the air pressure sensing switch 222 contacts to open thereby preventing the engine 36 of the boat 12 from starting. In addition, the timing cycle must be reset by turning off the ignition switch 236, or by turning on the manual blower switch 228.

When the timing cycle is reset and the blower motor BM1 is turned on via the manual blower switch 228 by the boat operator, the timing cycle will continue to run for approximately four (4) minutes, although any other time period could be used. When the timing cycle is completed, and the ready lamp 246 is illuminated, the boat ignition and starter circuits 238 are enabled and the engine 36 may be started. Once the boat engine 36 is running, the blower motor BM1 may be turned off and the boat engine 36 will resume normal operation. Once the boat engine 36 resumes normal operation, the blower motor BM1 may be turned on and off as needed via the manual blower switch 228.

Additionally, the boat operator has the option in an emergency to by-pass the timing module 224 by activating an emergency by-pass switch (not shown) allowing the boat engine 36 to be started immediately.

Figure 8:
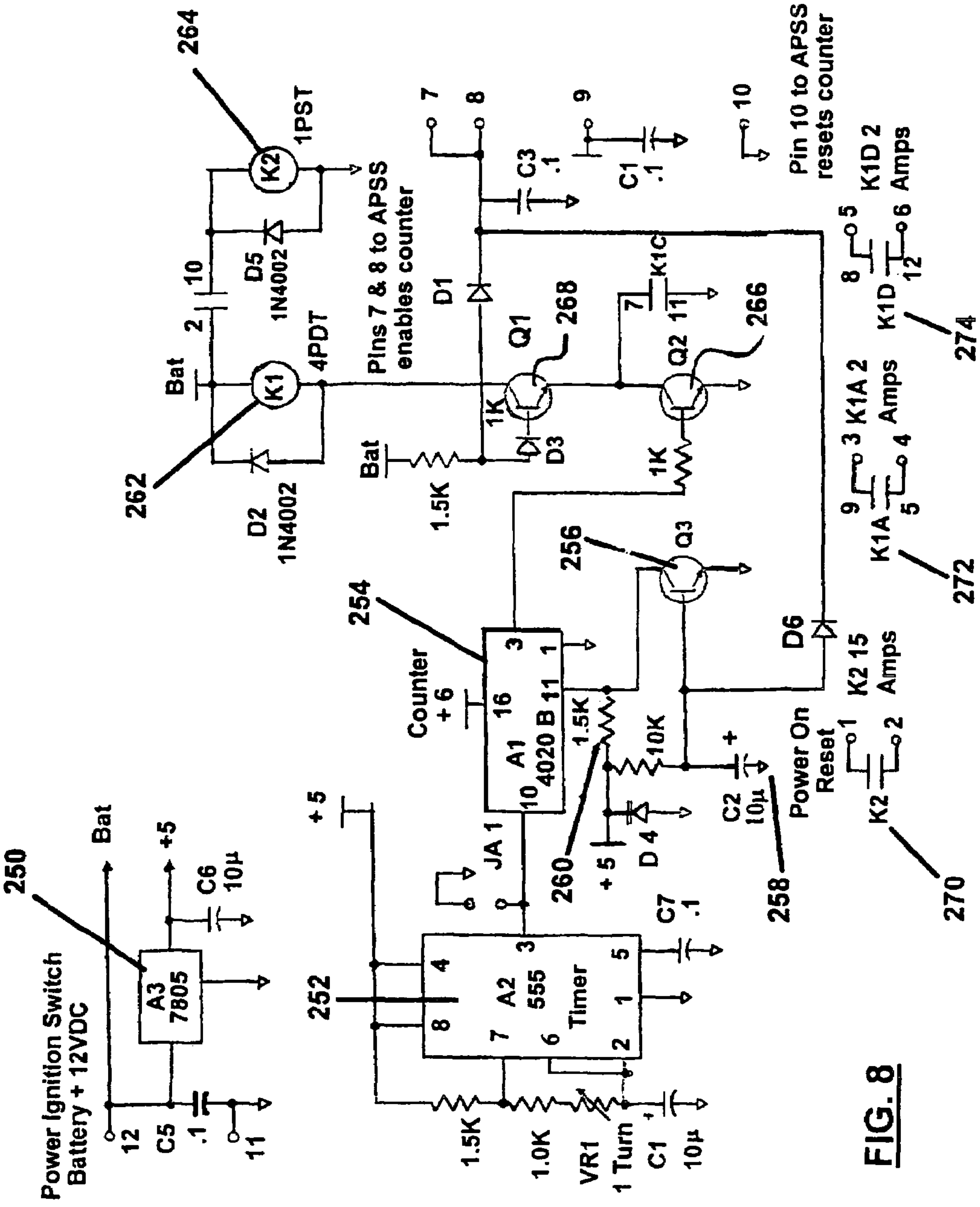
FIG. 8 is a schematic diagram of an alternate embodiment of the boat ignition safety apparatus

FIG. 8 is an another embodiment of the boat ignition safety apparatus 10. During operation of the safety apparatus 10, power is applied via the boat ignition switch 20 (shown in FIG. 1) so that +12 VDC is applied across pins 11 and 12 of a voltage regulator A3 250. The regulator A3 250 produces a regulated +5 VDC output that is supplied to the timing and control circuitry to be discussed. With power applied, a timer (A2) 252 begins to produce clock pulses and a binary counter (A1) 254 is reset due to a high logic level at its pin 11. This high logic level is created by the power on reset delay circuit coupled to the pin 11 of the counter 254, which is comprised of transistor (Q3) 256 and the resistive-capacitive network comprising capacitor 258, and resistor 260. If pins 7 and 8 of the timer (A2) 252 are maintained at ground potential, the reset condition for the disclosed electronic circuit will continue.

While the circuit is reset, pin 3 of the counter 254 will remain at a low logic level, which prevents relays K1 262 and K2 264 from energizing. In turn, this inhibits the ignition circuit and prevents power from being applied to the starter motor. Turning on the boat exhaust fan 22 and/or blower motor BM1 creates positive air pressure within the engine compartment 34, which air pressure sensing switch 26 (external to circuit shown in FIG. 8) detects and forces pins 7 and 8 to a positive potential. If pins 7 and 8 are at a positive potential greater than 2 volts, delay capacitor (C2) 258 charges until it reaches approximately 0.7 VDC, and transistor (Q3) 256 conducts, which applies a low logic level on the reset input (pin 11) to counter (A1) 254, allowing counter operation to begin timing.

Counting continues until the instant 16,384 counts are registered, and pin 3 of counter (A1) 254 goes high. With pin 3 high, transistors (Q1) 268 and (Q2) 266 will conduct, relays (K1) 262 and (K2) 264 will activate, thereby enabling the ignition and starter motor power when selected. Contact K1C provides a latch so that additional clock pulses do not effect the enabled status of the circuit. Relay contacts (K2) 270, (K1A) 272 and (K1 D) 274 close during the enabled status. The nominal time from end of reset to enabled status is approximately 4.1 minutes. Reset may be initiated at any time by grounding pins 7 and 8 for approximately 0.5 seconds or more. Timing will begin when the grounding of pins 7 and 8 is removed.

Figure 9:
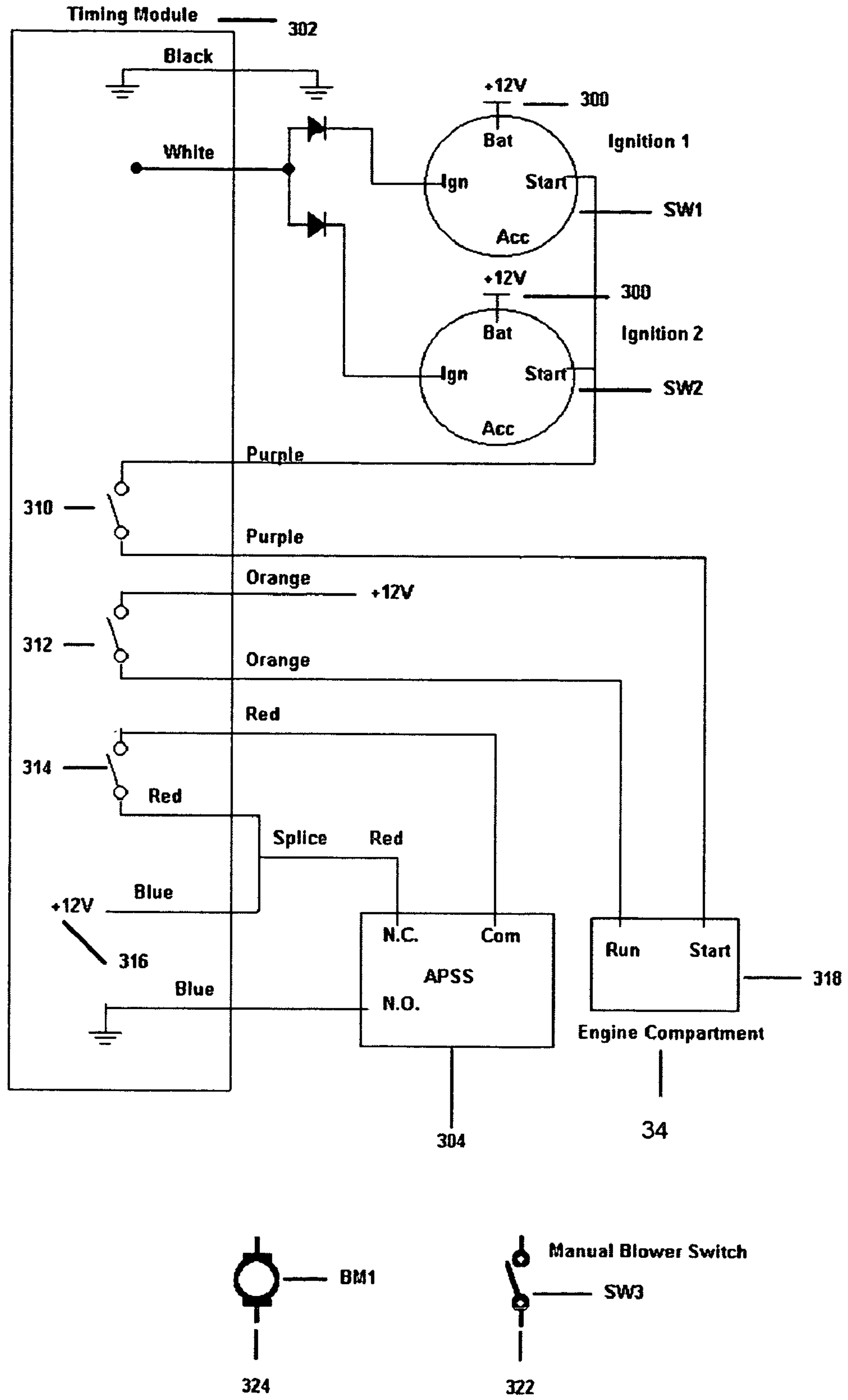
FIG. 9 is a schematic diagram of an alternate embodiment of the boat ignition safety apparatus.

FIG. 9 is a schematic diagram of an alternate embodiment of the boat ignition safety apparatus 10 for use with a boat 12 utilizing multiple engines 36. Ignition switches 306 and 308 allow one or both engines 36 to be started. When either engine is activated, +12 VDC power 300 is supplied to the timing module 302, which causes internal switches 310 and 312 to open, and internal switch 316 to close, disabling the ignition and starter circuits 318 in the engine compartment 34. The internal switch 316 remains closed until the boat operator turns on the manual blower switch SW3 322, which starts the boat ventilation/exhaust fan or blower motor BM1 324. The blower motor 324 creates positive air pressure within the engine compartment 34 that is sensed by the air pressure sensing switch 304. This causes air pressure sensing switch 304 to open its contacts and remove the ground connection from the internal switch 316, which starts the timing cycle. The timing cycle will continue for approximately four (4) minutes, although any other predetermined time period may be utilized. If the boat operator turns off the manual blower switch SW3 322 or the air pressure is interrupted before the timing cycle is completed, the air pressure sensing switch 304 will detect the change in air pressure and close its contacts. This in turn will stop the timing cycle and reset the timer to zero. This will continue until the air pressure sensing switch 304 detects that the air pressure has been restored. While the positive air pressure is restored, the ignition and starter circuit 318 will remain disabled. When the timing cycle is reset by restoring positive air pressure within the engine compartment 34, the air pressure sensing switch 304 closes its contacts, thus restarting the timing cycle for four (4) minutes. When the timing cycle is completed, the ignition and starter circuits 318 are enabled, thus allowing the engines 36 to be started. Once the engines 36 are running, the boat blower motor BM1 324 may be turned off. This causes the contacts on switch 314 to open, thereby removing the ground potential at the internal connection 316 thus allowing the engines 36 to resume normal operation. Additionally, the boat operator again has the option in an emergency to by-pass the timing module 302 by activating an emergency by-pass switch (not shown) allowing the engines to be started immediately.

Figure 10:
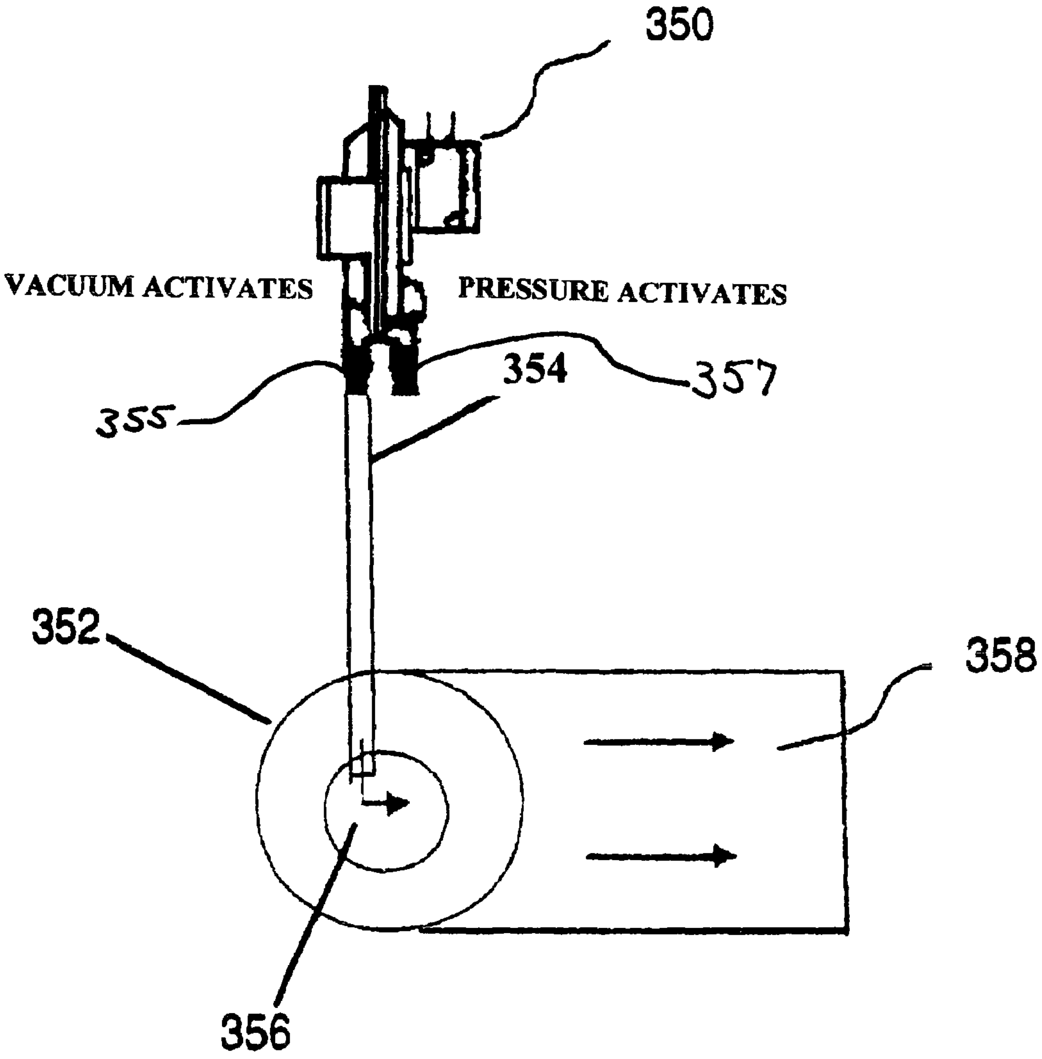
FIG. 10 is an elevation view showing an air pressure sensor used in the boat ignition safety apparatus to detect positive air flow within an engine compartment.

FIG. 10 shows the air pressure sensing switch 350, which may be located anywhere within the hull or engine compartment 34 of the boat 12, as long as the difference in air pressure between the inside and outside of the engine compartment 34 closes the normally open contact of the air pressure sensing switch 350 when the air in the engine compartment 34 is being ventilated, and when the exhaust fan 22 or a bilge blower motor 352 is activated. During operation of the sensing switch 350, sensing tube 24,354 coupled to the air pressure sensing switch 350 via vacuum activation connector 355, is used to sense a vacuum at the air inlet 356 of the bilge blower 352. This vacuum indicates the successful ventilation of air through the air outlet 358 to the outside of the boat 12. It should also be appreciated that the sensing tube 354 may also be arranged such that the one end is coupled to a pressure activation connector 357 and the other end of the tube 354 is placed near the air outlet 358. In this circumstance, the sensing switch 350 detects a pressure that is created by the operation of the bilge blower motor 352.

Figure 11:
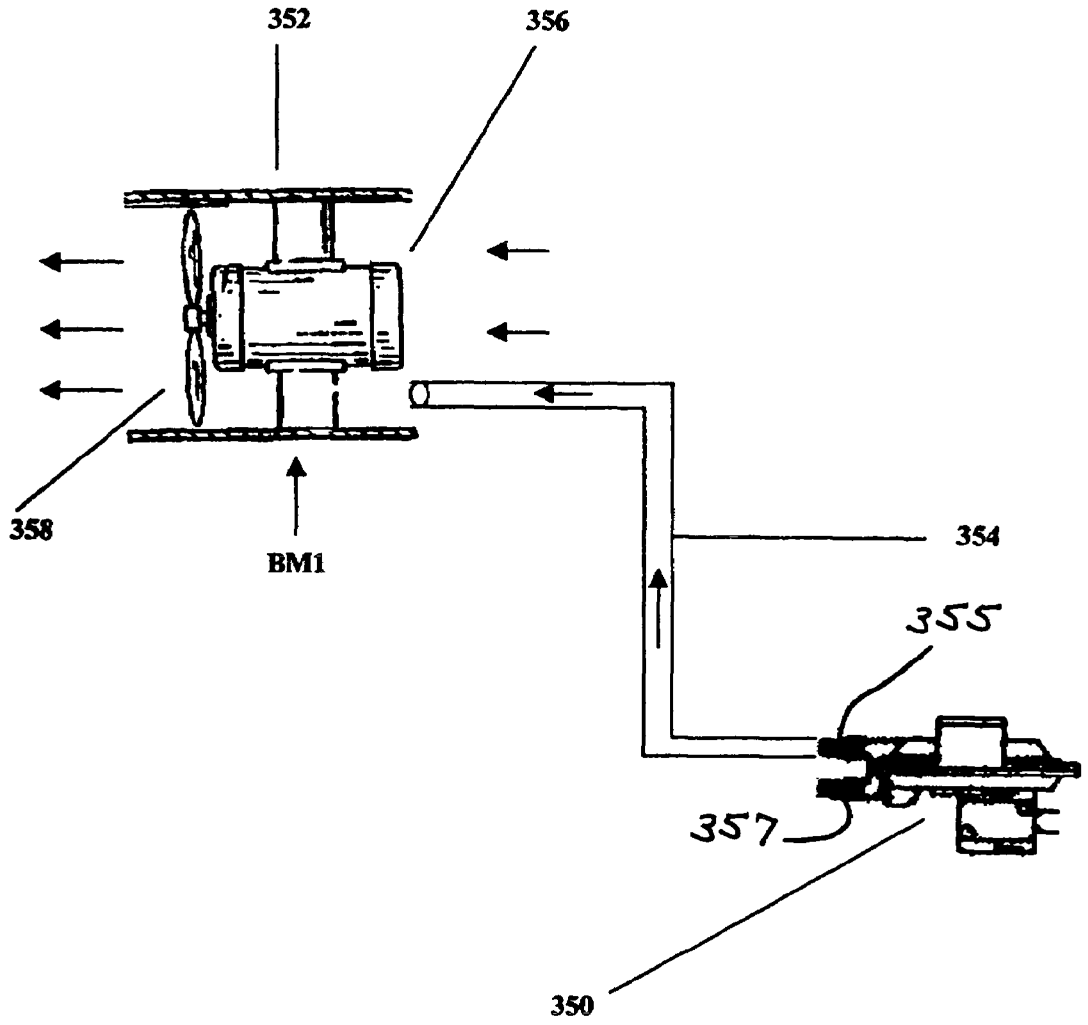
FIG. 11 is an elevation view showing an air pressure sensor coupled to an in-line blower motor in one embodiment of the present invention.
Figure 12:
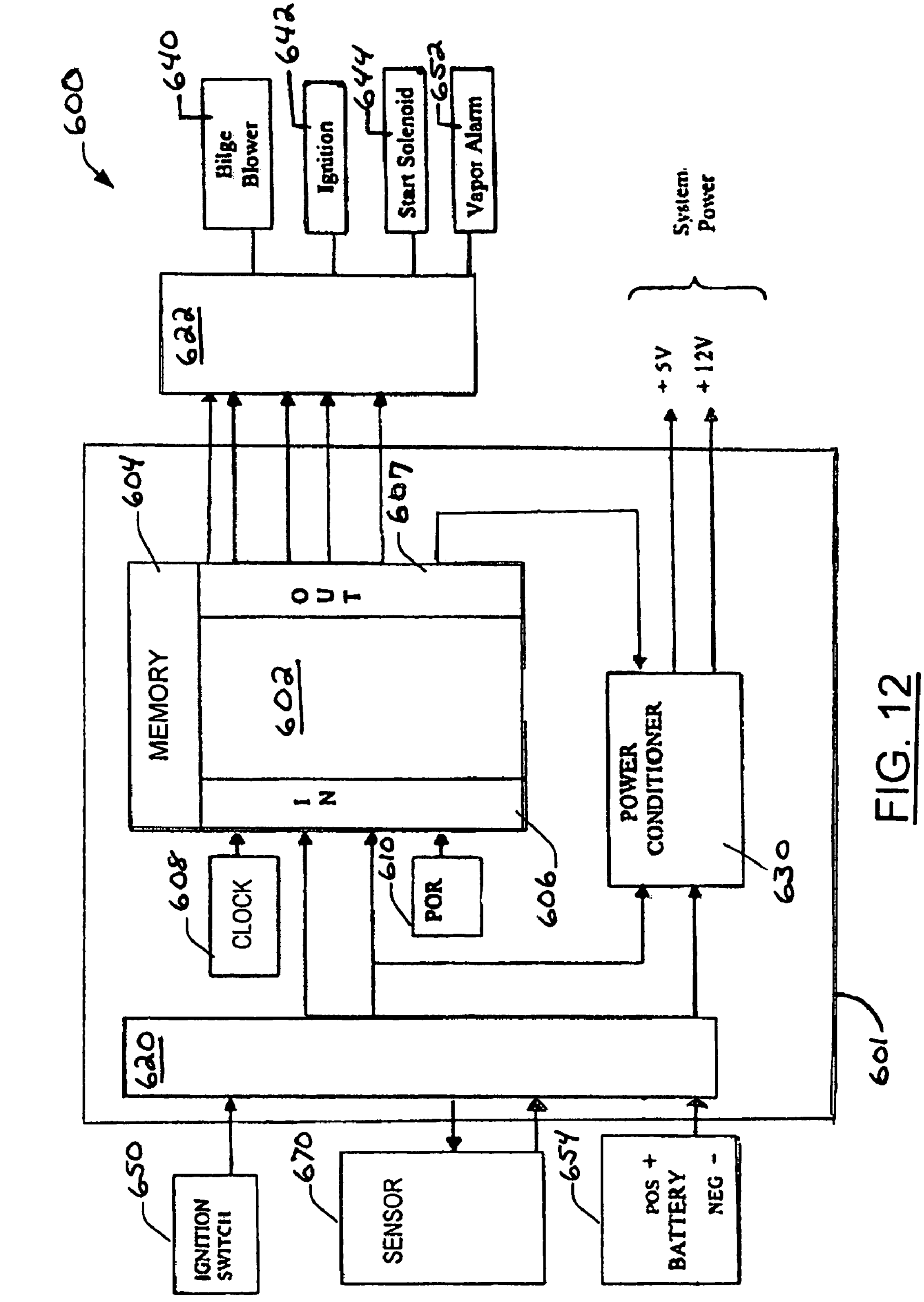
FIG. 12 is an example of boat safety apparatus that can be implemented in accordance with an aspect of the current invention.

FIG. 11 shows the air pressure sensing switch 350 when used with an in-line blower motor BM1 or exhaust fan 22, 352. The air pressure sensing switch 350 may be located at any given location within the hull of a boat 12 as long as the air pressure sensing tube 24 is located near the bottom of the engine compartment 34 and above the normal bilge water line. When the in-line blower motor BM1,352 or exhaust fan 22 is running, air enters through the air inlet 356 and exits through the air outlet 358, which creates negative air pressure within the air pressure sensing tube 24,354 thereby causing the air pressure sensing switch 350 to activate its contacts. This embodiment also takes advantage of negative air pressure rather than the earlier embodiments, which monitor positive air pressure within the engine compartment 34.

In an alternate embodiment, the air pressure sensing switches 26,126, 184, 222 may be replaced with a combination of vapor sensors and pressure sensors that are positioned within the engine compartment 34. The air pressure sensors are used to determine whether there is an adequate flow of air within the engine compartment 34, thus verifying that the exhaust fan 22 or blower motor BM1 is operating properly. The vapor sensors are used to monitor the amount of volatile fumes within the engine compartment 34, determining whether to turn the exhaust fan 22 on or off. The vapor sensors may be positioned in any operative location within the engine compartment 34. In one aspect, the vapor sensors may be positioned such that they are above the normal bilge water line of the engine compartment 34.

In this embodiment, the boat ignition safety apparatus 10 is initiated when the boat operator attempts to actuate the ignition switch. When this occurs, the control module 14 interrupts the ignition circuit and prevents the boat user from being able to start the engine 36. Additionally, upon detection of an attempt to actuate the ignition switch 20, the control module 14 then automatically turns on the exhaust or ventilation fan 22 or blower motor BM1. The exhaust fan 22 dissipates any fuel fumes or vapors that may have accumulated in the boat engine compartment 34 as a result of the boat 12 not having been operated. Once activated, the exhaust fan 22 will run for a predetermined time delay, maintaining the flow of fresh air through the engine compartment 34. During the predetermined time delay, the engine 36 of the boat 12 is disabled and may not be started.

Once the predetermined time delay expires, the vapor sensors are activated to monitor the amount of fuel fumes within the engine compartment 34. If the vapor sensors do not detect volatile fuel fumes or vapors, the control module 14 enables the ignition and starter circuits, turns off the alarm light, allowing the boat engine 36 to be started. Once the engine 36 is started, the exhaust fan 22 will continue to run for another predetermined period of time.

If fuel fumes are detected by the vapor sensors, the control module 14 continues the interruption of the ignition and starter circuits and the user is prevented from starting the engine 36. Generally, unless there is no detection of volatile fuel fumes after the predetermined time delay, the engine will not be allowed to start. When this occurs, the exhaust fan 22 would then be re-activated, and would continue to run until the fuel fumes have been cleared.

Other variations are also contemplated within the scope of the present invention. For example, in lieu of relay logic in the form of electro-mechanical and time delay relays as illustrated, solid state and digital switches could be used. Additionally, the present invention may also be designed around microprocessor or microcontroller circuitry. The use of digitally programmable control devices would allow for advanced monitoring of air pressure and air flow, reprogrammable time delays, and more versatile control of the engine. The use of microprocessor technology, in conjunction with standard memory, communication and input/output devices, will also allow the boat ignition safety apparatus to monitor and store statistics related to its operation such as air pressure, air flow, use of the by-pass switch, failures, and other conditions. One of ordinary skill in the art of electronics will understand that a wide variety of data acquisition functions can be implemented using microprocessor technology, including but not limited to data storage, printing of monitored data, and wire/wireless transfer of information.

One embodiment of the boat ignition safety apparatus, referred to by the numeral 600, is discussed with respect to FIGS. 12-15 of the drawings. Specifically, the safety apparatus 600 comprises a safety control module 601 that includes a microprocessor 602 that in addition to receiving and generating various communication signals, also provides the necessary hardware, software, and memory to carryout one or more functions to be described. Coupled to the microprocessor 602 is a memory 604. The memory 604 may comprise non-volatile memory or a combination of volatile and non-volatile memory both. For example, the volatile memory may comprise random access memory (RAM) such as static RAM, while the non-volatile memory may comprise flash memory, electrically erasable programmable read-only memory (EEPROM), or other suitable non-volatile memory. The microprocessor 602 also provides input and output buffers 606 and 607 so as to allow the microprocessor 602 to communicate with the various components coupled thereto that are provided by the safety apparatus 600 to be discussed. A clock generator 608 is coupled to the microprocessor 602 so as to provide suitable clock signals for the operation thereof. Also coupled to the microprocessor 602 is a power-on-reset (POR) unit 610 that is provided to initialize the microprocessor 602. In order to isolate the communication signals being received and transmitted by the microprocessor 602, an input isolating component 620 and an output isolating component 622 are provided. In one aspect, it is contemplated that the input and output isolating components 620,622 may comprise optical coupling devices, such as a photo-emitter/detector pair, that transmit data via light pulses. The input and output isolating components 620,622 serves to isolate and suppress any voltage transients or overcurrents from being sent to the microprocessor or being transmitted by the microprocessor 602 to other components coupled thereto.

Coupled to both the input and output buffers 606, 607 and to the output of the input isolating component 620 is a power conditioner 630. The power conditioner 630 receives power from a craft battery 632 or other portable power source and generates various regulated voltages to power the microprocessor 602 and various other components to be discussed. For example, the power conditioner 630 may be configured to provide a +5 VDC and a +12 VDC power output.

Coupled to the output isolating component 622 is a bilge blower or exhaust fan 640 that is positioned in the engine compartment 34 so as to evacuate any volatile fuel fumes that may concentrate therein. Also coupled to the output isolating component 622 is an ignition circuit 642. The ignition circuit 642 as is generally known in the art, typically comprises a voltage boosting coil and a timing system for delivering the increased voltage to the spark plugs maintained by each of the cylinders of the engine 36. A starter circuit/solenoid 644 is provided by the safety apparatus 600 to allow a boat operator to turn the engine 36 over by actuating an ignition switch 650. While the engine 36 is being turned over, the ignition circuit 642 is able to energize the sparkplugs of the engine 36 so as to start it. Once the engine 36 is started, the ignition circuit 642 is responsible for providing continuous timed, high-voltage signals to the sparkplugs of the engine 36 to allow the engine to continuously run. As such, the ignition circuit 642 and the starter solenoid 644 work together to initially start the boat engine 36. But once the engine 36 is running, the starter circuit 644 is no longer required, while the ignition circuit 642 provides continual operation of the engine 36. Another device coupled to the output isolating component 622 is a vapor alarm 652. The vapor alarm 652 is provided to give an audible or visual indication to the boat operator that a hazard exists on the boat 12, the detection of which will be discussed below. The vapor alarm 652 may give a primary alarm such as the display of a solid light and a secondary alarm that comprises a blinking light.

Coupled to the input isolating component 620 is an ignition switch 650, a battery 654, and a vapor sensor 670. Specifically, the battery 654 provides power to the power conditioner 630 and to the various components of the safety apparatus 600, including the microprocessor 602, the vapor sensor 670, the exhaust fan or bilge blower 640, the ignition circuit 642, the starter circuit/solenoid 644, and the vapor alarm 652. The ignition switch 650 comprises a standard ignition switch used with boats, and thus provides an OFF position, an ON position, and a START position. As such, when the switch is placed in the OFF position, the engine is inoperable; when placed in the ON position, power from the power conditioner 630 is delivered to the safety device 600; and when in the START position, the starter circuit is energized.

The vapor sensor 670 is configured to detect the presence of fuel vapor or fumes that may emanate from the engine 36, and which consequently tend to concentrate or accumulate over time in the engine compartment 34. When fumes or vapor is detected, the vapor sensor 670 generates an alarm notification signal that is delivered to the microprocessor 602. Specifically, as the amount of vapor increases in the engine compartment 34, the higher the temperature that is detected by the vapor sensor 670. Correspondingly, as the amount of vapor decreases in the engine compartment 34, the lower the temperature that is detected by the vapor sensor 670. Thus, the vapor sensor 670 varies in temperature directly with the change in fuel vapor concentrations in the engine compartment 34. Because, the vapor sensor 670 senses vapor concentrations as a temperature, prior art vapor sensors may produce erroneous results if the ambient temperature of the engine compartment 34 fluctuates. To overcome this problem, the vapor sensor 670 is configured to automatically calibrate itself with the temperature and humidity found within the engine compartment 34, so that the vapor sensor 670 is able to accurately detect when fuel vapors rise above a particular level or concentration for which the sensor 670 can be set. Thus, the vapor sensor 670 is sensitive to the ambient temperature/humidity of the engine compartment 34, and as such, adjusts itself so that it is able to accurately detect the presence of fuel vapors. One level or threshold in which the vapor sensor 670 can be set is referred to as the L.E.L. or lower explosive limit. For example, the L.E.L. may be set at 15%, which refers to an air volume comprising 15% fuel vapor and 85% of fresh air. As such, the lower explosive limit is a threshold value relating to a concentration of fuel vapor. For example, if the concentration of fuel vapor detected by the sensor 670 remains below the L.E.L., then the vapor sensor 670 does not generate an alarm notification signal. However, if the concentration of fuel vapor detected by the sensor 670 rises above the L.E.L., then the vapor sensor 670 notifies the safety control module 601 by sending the alarm notification signal so as to issue a warning via the vapor alarm 652. In addition, the vapor sensor 670 is typically housed in a copper housing, although any other suitable housing material may be utilized. Moreover, the vapor sensor 670 provides EFI shielding, suitably configured to be operational in a damp or wet environment, and is able to detect many hydrocarbon based fumes or gasoline vapor. Finally, an emergency bypass switch (not shown) may be provided to allow the boat operator to circumvent the operation of the boat ignition safety apparatus 600 in a manner to be discussed. In one aspect, the bypass switch may comprise a double-pole double-throw switch, which disconnects the safety control module 601 almost completely from the various operational components of the boat 12 to which the bypass switch is connected.

Figure 13:
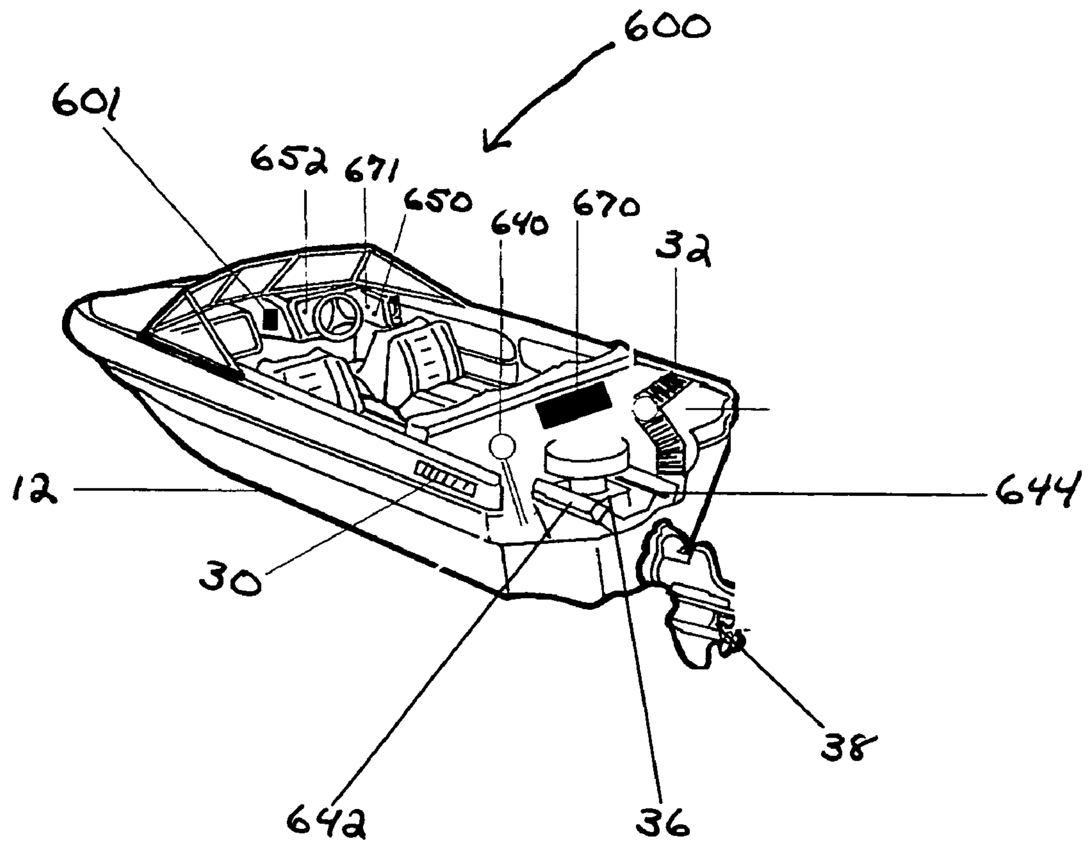
FIG. 13 is a perspective view of a boat equipped with another embodiment of the boat ignition safety apparatus of the present invention with the engine compartment shown partially cut-away.

FIG. 13 shows the relative placement of the components comprising the boat ignition safety apparatus 600 within the boat 12. As shown, the vapor sensor 670 is positioned within the engine compartment 34 or bilge of the boat 12, while the components comprising the safety control module 601 may be remotely located away from the vapor sensor 670. Such a configuration yields increased flexibility in mounting the safety apparatus 600, as the safety control module 601 is not confined to the engine compartment 34. Furthermore, the vapor sensor 670 may be located near the brushes of the solenoid/starter circuit 644, where electrical sparks or arcing is likely to occur when the engine 36 is started. Moreover, because the temperature, humidity detection and calibration functions are performed by the vapor sensor 670 directly within the engine compartment 34, the accuracy of the operation of the safety apparatus 600 is enhanced. This is in contrast to prior art configurations in which the temperature and humidity detection and calibration is performed remotely from the vapor sensor, where the humidity and temperature may be different from that encountered by the remotely mounted vapor sensor.

Figure 14:
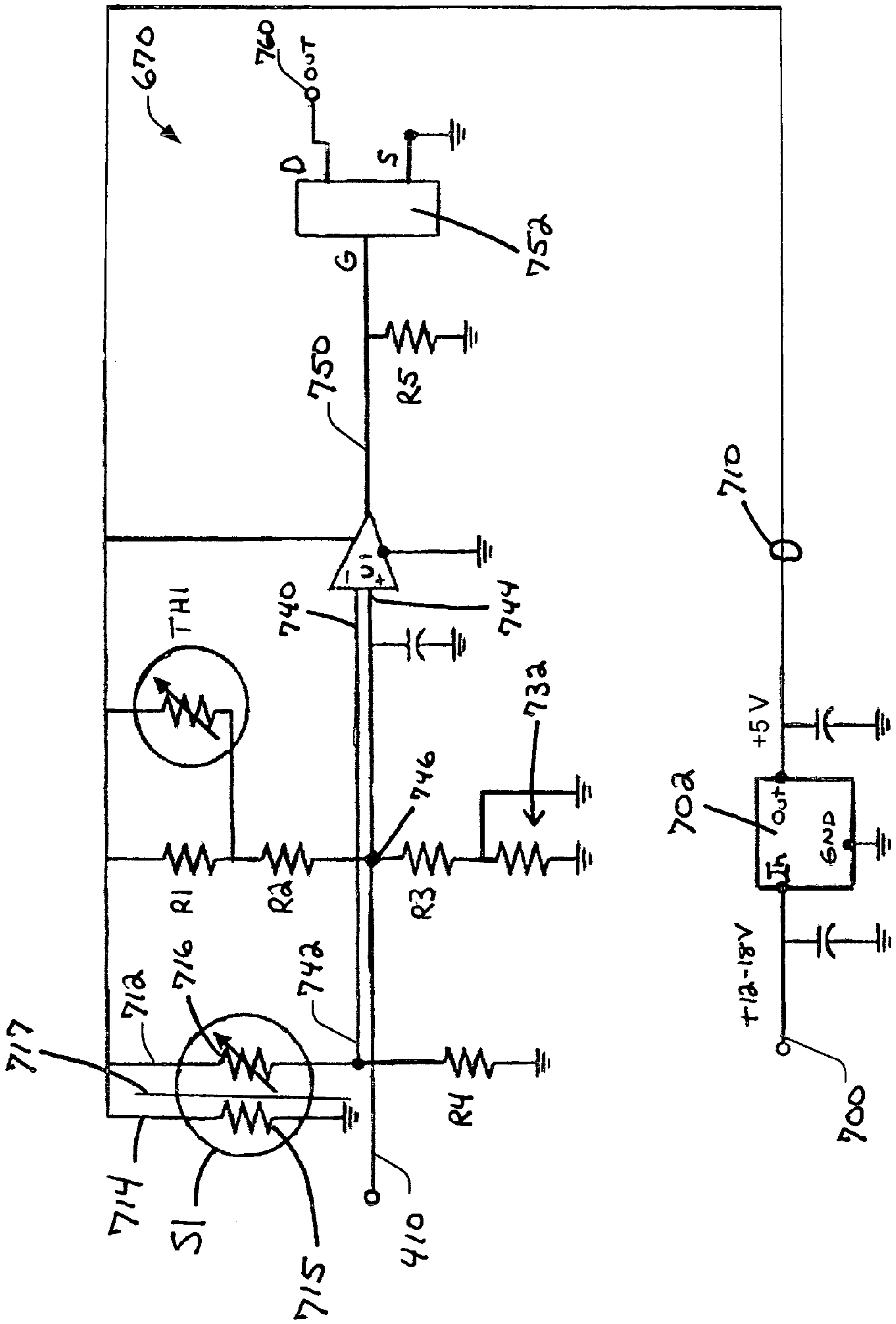
FIG. 14 is an example of a vapor sensor circuit in accordance with an aspect of the present invention.

FIG. 14 shows a circuit comprising the vapor sensor 670 when the safety apparatus 600 is put into operation. As such, the discussion that follows will be directed to the operation of the circuitry comprising the vapor sensor 670, after the safety apparatus 600 has been installed in the boat 12 as previously discussed with regard to FIG. 13, and whereby the following initial conditions have been established: The ignition switch 650 has not been actuated for at least 2 hours (although this time period may be any time period desired); the concentration of fumes in the engine compartment 34 is at a safe level below an L.E.L. of 15%; and no power is being supplied to the vapor sensor 670. Next, when the ignition switch 650 is placed into the ON position, power from the power conditioner 630, +12 VDC for example, is applied to pin 700 coupled to the input of a power regulator 702. The power regulator 702 processes the input power and provides a regulated output voltage of approximately +5 VDC at a node 710. The regulated output voltage is applied to inputs 712 and 714 of a sensing element S1 at node 710. The sensing element S1 comprises a heater 715 and a detector 716, which are separated by an insulating partition 717, which is coated on both sides by tin or other thermally conductive metal oxide. It should be appreciated that the sensing element S1 is sensitive to fumes or vapor emitted by hydrocarbon based fuels or materials, such as gasoline for example. In addition, power supply terminal 720 and 722 of a comparator U1 is also coupled to node 710 and to ground respectively. A thermistor TH1 is coupled at one terminal to node 710 while its second terminal is coupled to a node 730, thus placing the thermistor TH1 in parallel with a resistor R1 that is coupled between nodes 710 and 730. In series with resistor R1 is a resistor R2, a resistor R3, and a potentiometer 732, which is coupled to ground. As such, the thermistor TH1 and the resistor R1 are subjected to a common voltage potential which is established by the voltage divider circuit formed by the resistors R1,R2,R3, and the potentiometer 732. The comparator U1 comprises a negative or inverting input 740, and a positive or non-inverting input 744. As such, the negative comparator input 740 is coupled to a node 742 that resides between the detector S1 and a resistor R4, which is coupled to ground at is remaining terminal. Correspondingly, the positive input 744 of the comparator U1 is coupled to a node 746 that is between resistors R2 and R3. Finally, the comparator U1 includes a comparator output 750 that is coupled to the gate terminal G of a transistor 752, wherein its source terminal S is coupled to ground, while the drain terminal D serves as an output 760 that is coupled to the microprocessor 602 via input isolating component. It should be appreciated that the transistor 752 may comprises an n-channel metal oxide semiconductor field-effect transistor (MOSFET), although the present invention may be readily adapted to be operable with a p-channel MOSFET as well. In addition, the output 750 is coupled to ground via a resistor R5.

Thus, during operation of the vapor sensor 670, as the power regulator 702 supplies its regulated output to node 710, the heater 715 of the sensing element S1 is preheated so that the insulating partition 717 achieves an approximately constant predetermined temperature. As the amount of fumes or vapor (per volume of air) occupying the same region as the sensing element S1 increases, a combustion process also occurs on the portion of the tin surface of the partition 717 that is adjacent to the heater 715. In other words, the magnitude of the combustions increase with increased vapor or fume presence, while the combustions decrease with decreased vapor or fume presence. Thus, the increasing combustion reactions causes the partition 717 to increase in temperature. This increase in temperature is detected by the detector 716 of the sensing element S1. Somewhat simultaneously with the heating of the partition 717 of the sensing element S1, the thermistor TH1 is also powered. The arrangement of the sensing element S1 and thermistor TH1 form a temperature compensated wheatstone bridge. Thus, when an increased amount of fuel vapor is present at sensing element S1, the detector 716 decreases in resistance, thus causing an increase in the voltage potential at node 742. Whereas, a decreased amount of fuel vapor at the sensing element S1 causes an increase in resistance, thus decreasing the voltage potential at node 742. The node 746 corresponds to an ambient temperature/humidity calibration input as briefly discussed above, that provides a comparison reference to node 742, which is used by the comparator U1. Thus, as the air temperature in the engine compartment 34 rises, the voltage rises at node 742 due to the operation of the sensing element S1, and at node 410 due to the operation of the thermistor TH1. The thermistor TH1 and the sensor S1 coact to mitigate the effects of changes in ambient temperature and humidity within the engine compartment 34. In addition, this functionality allows the vapor sensor 670 to detect fuel vapor and fumes over a wide temperature range.

The comparator U1 compares the voltage levels of node 742 applied at its negative terminal 740, and at node 746 applied to its positive terminal 744. As such, the comparator U1 outputs a voltage level at output 750 depending on which terminal 740 or 744 has the highest positive voltage. For example, when the concentration of fumes are minimal, or below the 15% L.E.L. threshold, the voltage at the negative terminal 740 of the comparator U1 will be lower than that at the positive terminal 744. This causes the output 750 of the comparator U1 at to rise to a relatively high voltage value, such as +5 VDC for example, thus turning on the transistor 752, such that output 760 is pulled to a low voltage level or ground for example. This low voltage at the output 760, which is monitored by the microprocessor 602 prevents any warning from being displayed or announced by the vapor alarm 652. Alternatively, when a relatively high concentration of vapor or fumes are present, such as above the 15% L.E.L. threshold, the voltage at the negative terminal 740 is greater than that at the positive terminal 744. As a result, the output 750 of the comparator U1 falls to a relatively low voltage, such as ground, thus turning off the transistor 752 thus leaving the drain D floating, which indicates to the microprocessor 602 that there are hazardous fumes at or above the 15% Lower Explosive Limit (LEL) present in the engine compartment 34. In response, the microprocessor 602 activates the vapor alarm 652 so as to warn the boat operator of the present hazardous condition.

Figure 15A:
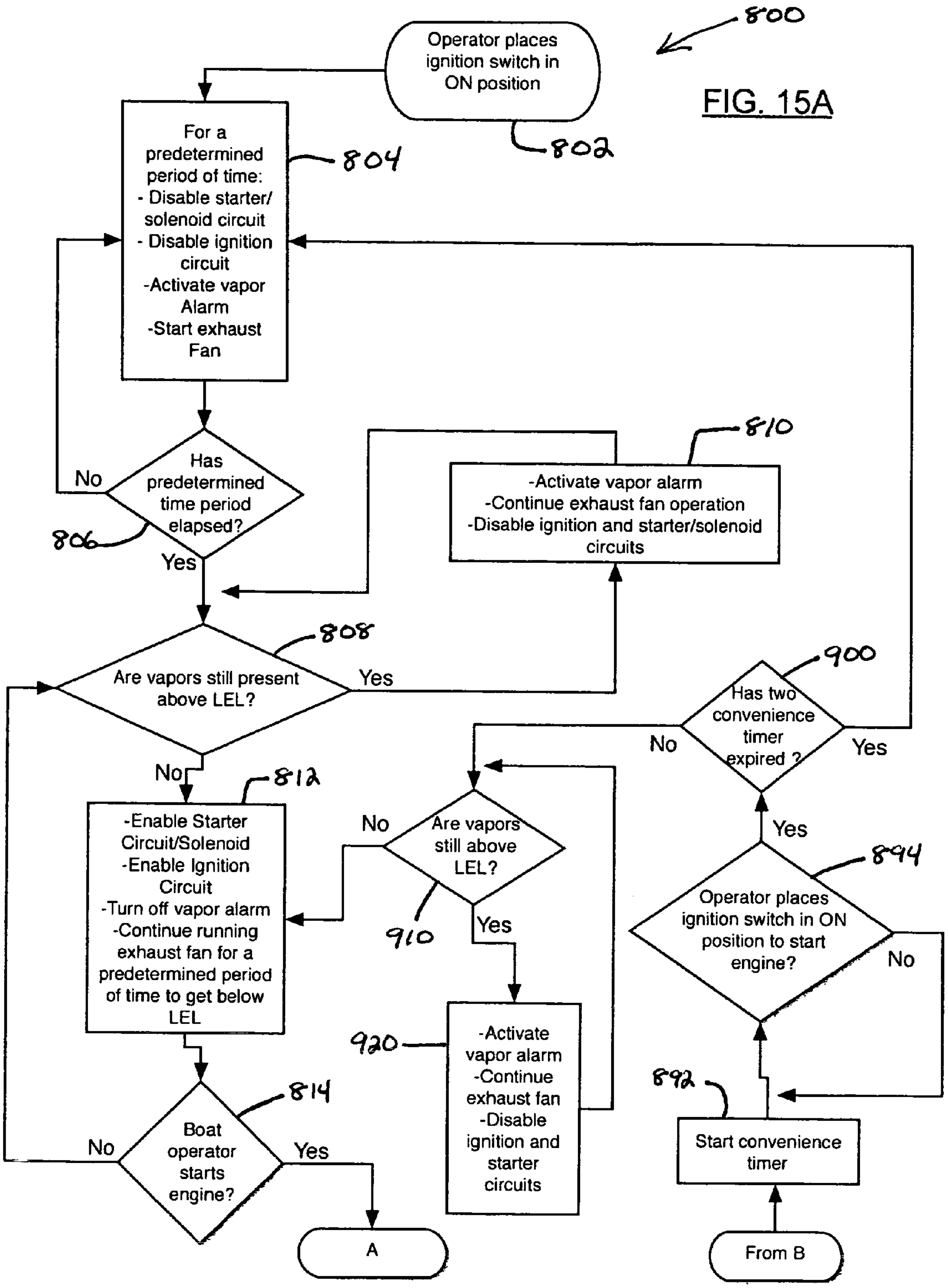
FIGS. 15A-15B shows a flow diagram illustrating a methodology for operating the boat ignition safety apparatus in accordance with an aspect of the present invention.
Figure 15B:
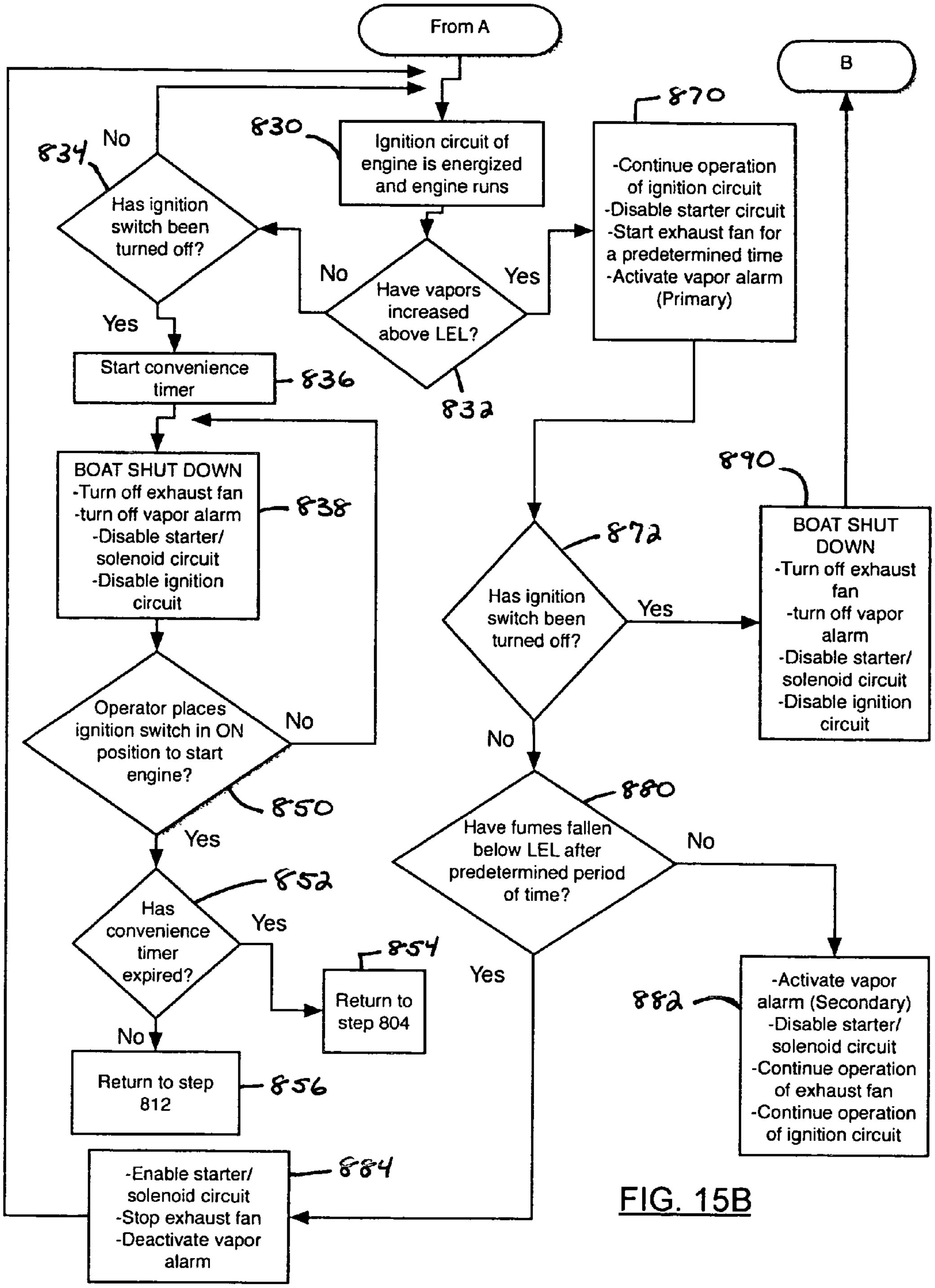

The operational steps taken by the boat ignition safety apparatus 600 are generally referred to by the numeral 800 as shown in FIGS. 15A and 15B of the drawings. It should be appreciated that the operational steps and instructions discussed below may be embodied in hardware or software or a combination of both maintained by the microprocessor 602 of the safety control module 601. Initially, at step 802, the boat operator attempts to start the boat 12 by actuating the ignition switch 650 to the ON position. Somewhat simultaneously with step 802, the starter circuit/solenoid 644 and the ignition circuit 642 are disabled, while the vapor alarm 652 and the exhaust fan 22 or bilge blower 640 are started for a predetermined period of time, as indicated at step 804. It should be appreciated that the predetermined period of time may comprise any time duration, such as 1 minute, for example. Thus, during step 804, the boat operator is unable to start the engine 36 of the boat 12. In addition, it should be appreciated that by disabling the starter circuit 644, which draws high currents and thus is a potential source of errant electrical sparks or electrical arcing, the potential for igniting volatile vapors or fumes that have collected in the engine compartment 34 is removed. At step 806, the process 800 determines whether the predetermined period of time has elapsed. If the predetermined period of time has not elapsed, then the process returns to step 804. However, if the predetermined period of time has expired, then the process 800 continues to step 808, where the vapor sensor 670 determines whether the concentration of fuel vapors in the engine compartment 34 are above the lower explosive limit (L.E.L.) set at the vapor sensor. If the concentration of fuel vapors is above the L.E.L, then the process 800 continues to step 810. At step 810, the vapor alarm 652, and the bilge blower 640 or exhaust fan continues to operate, while the ignition and starter circuits 642,644 remain disabled. However, if the concentration of fuel vapors is not above the L.E.L., then the process 800 continues to step 812, where the starter circuit 644 and the ignition circuit 642 are enabled, while the vapor alarm 652 is disabled. Additionally at step 812, the exhaust fan or bilge blower 640 continues to operate for a predetermined period of time, such as 30 seconds, for example. Next, at step 814, the process 800 determines whether the boat operator has placed the ignition switch 650 into its START position so as to start the boat's engine 36. If the boat operator does not start the engine 36 of the boat 12, then the process 800 returns to step 808. But if the boat operator does start the engine 36, then the process 800 continues to step 830, where the ignition circuit 642 is energized allowing the engine 36 to operate, or otherwise run. While the engine 36 is operating, the vapor sensor 670 determines whether the concentration of fuel vapors have increased above the L.E.L. limit or not, as indicated at step 832. If the vapors have not increased above the L.E.L threshold, then the process 800 continues to step 834. At step 834, the process 800 determines whether the boat operator has placed the ignition switch 650 into its OFF position, so as to terminate the operation of the engine 36. If the ignition switch 650 has not been placed into its OFF position, the process 800 returns to step 830, thus allowing continued activation of the ignition circuit 642, so as to allow the engine 36 to run, while the vapor sensor 670 continues to monitor for the presence of fuel vapor within the engine compartment 34. However, if the ignition switch 650 has been placed into its OFF position, then a convenience timer is started, as indicated at step 836. The convenience timer is maintained by the microcontroller 602, and may be configured to update any predetermined value, such as a 2 hours for example. Next, at step 838, the boat 12 is shut down, such that the exhaust fan 22 or bilge blower 640 and the vapor alarm are turned off, while the starter circuit 644 and ignition circuit 642 are deactivated. Next, at step 850, the process 800 determines whether the boat operator has placed the ignition switch 650 into the ON position or not. If the operator has not placed the ignition switch 650 into the ON position, then the process 800 returns to step 838. However, if the boat operator does place the boat ignition switch 650 into the ON position, the process 800 continues to step 852. At step 852, the process 800 determines whether the convenience timer has expired or not. If the convenience timer has expired, then the process 800 returns to step 804, as indicated at step 854. However, if the convenience timer has not expired then the process 800 returns to step 812, as indicated at step 856.

Returning back to step 832, if the fuel vapors have increased in the engine compartment 34 to a level that exceeds the L.E.L., then the process 800 continues to step 870. At step 870, the starter circuit 644 is disabled, however, the ignition circuit 642 is still enabled so as to allow the boat engine 36 to continue to operate, or otherwise run. That is, the engine 36 continues to run, but should the engine 36 be shut off via the ignition switch 650 or otherwise shut down for any reason, the boat engine 36 cannot be subsequently started due to the fact that the starter circuit 644 solenoid is disabled at step 870. Thus, because the boat ignition safety apparatus 600 allows the engine 36 to remain running when fuel vapors above the L.E.L. threshold have been detected, the operator is able to continue to have full operating control of the movement of the boat 12. As such, the boat operator is able to avoid any obstacle, such as another boat, should one be presented in its path. Additionally, at step 870, the vapor alarm is activated for a predetermined period of time. The vapor alarm may comprise a primary alarm, such as a solid illuminated light for example. Next, at step 872, the process 800 determines whether the ignition switch 650 has been placed in its OFF position. If the ignition switch 650 has not been placed into its OFF position, then the process continues to step 880, where it is determined whether the fuel vapors have fallen below the L.E.L. or not. If the fuel vapors have not fallen below the L.E.L. at step 880, then the process continues to step 882. At step 882, the vapor alarm issues a secondary warning, such as a blinking or flashing light, while the starter circuit 644 is disabled. In addition, the bilge blower 640 and the ignition circuit 642 remain activated. However, if at step 880, the fuel vapors have fallen below the L.E.L. threshold, then the process 800 continues to step 884, where the starter solenoid circuit 644 are enabled, while the bilge blower 640 and the vapor alarm 652 are deactivated. Upon the completion of step 884, the process 800 returns to step 830.

Returning to step 872 of the process 800, if the ignition switch 850 has been placed into its OFF position, then the process continues to step 890. At step 890, the boat 12 is shut down, such that the starter circuit 644, the ignition circuit 642, the exhaust fan 22 or bilge blower 640, and the vapor alarm 652 are all disabled, or otherwise turned off. Somewhat simultaneously with step 890, step 892 is performed whereby the convenience timer is started, as previously discussed. It should be appreciated that the convenience timer may comprise any desired time period, such as 2 hours for example. Next, at step 894, the process 800 determines whether the operator has placed in the ignition switch 850 into its ON position or not. If the operator has not placed the ignition switch into the ON position, then the process 800 remains at step 894. However, if the ignition switch 850 has been placed into the ON position, then the process continues to step 900, where the process 800 determines whether the convenience timer has expired or not. If the convenience timer has expired then the process 800 returns to step 804, but if the convenience time has not expired then the process 800 continues to step 910. At step 910, the process 800 determines whether the concentration of fuel vapors in the engine compartment are still above the L.E.L. threshold. If the fuel vapors are above the L.E.L. threshold, then the process continues to step 920 where the vapor alarm is actuated, the exhaust fan or bilge blower 640 is actuated, and the starter and ignition circuits are disabled. Once step 920 is performed, the process 800 returns to step 910 until the vapor level falls below the L.E.L. threshold. It should also be appreciated that a secondary alarm may be activated if the vapor concentration does not fall below the L.E.L. limit after a predetermined period of time, such as 5 minutes for example. If the vapors fall below the L.E.L. threshold at step 910, then the process continues to step 812 as previous discussed.

Additionally, if the boat operator is in an emergency situation that requires immediate movement and navigation of the boat 12, the operator may actuate the emergency bypass switch to circumvent the operational steps 800. Thus, when the bypass switch has been actuated, the ignition circuit and the starter circuit 642, 644 are enabled. As such the user is able to immediately start the engine 36 of the boat 12 upon placing the ignition switch 650 into its START position. Once the bypass switch has been actuated, the boat operator has the ability to immediately start the boat 12 via the ignition switch 650.

It will, therefore, be appreciated that one advantage of one or more embodiments of the present boat ignition safety apparatus is that the vapor sensor is able to directly calibrate itself with respect to the temperature and humidity found within the engine compartment of a boat. Another advantage of the boat ignition safety apparatus is that when the engine of the boat is in operation and fuel vapors rise above a predetermined level, the ignition circuit remains active allowing the boat operator to retain navigational control over the boat. Yet another advantage of the boat ignition safety apparatus is that an exhaust fan or bilge blower is automatically activated when the concentration of fuel fumes rises above a predetermined level. An additional advantage of the boat ignition safety apparatus is that the concentration of vapors within the engine compartment is analyzed prior to the initial start of the boat's engine. Still another advantage of the present invention is that when fuel vapors above a predetermined level are detected by the vapor sensor, that the starting/solenoid circuit is disabled.

One or more embodiments of the present invention could also be used in conjunction with other types of machines in which fumes accumulate in enclosed or partially enclosed compartments. For example, the present invention could be used in conjunction with automobiles, aircraft, electrical panels that house gaseous emitting battery supplies, and other uses. The present invention can be adapted for use in any situation in which fumes need to be evacuated from an enclosed environment before further operations within that enclosed environment are undertaken.

What is claimed is:

1. A boat ignition safety apparatus for a boat, the boat having an engine mounted in an engine compartment, an ignition circuit to allow continuous operation of the engine, and a starter circuit to start the engine, the safety apparatus comprising:

a safety control module adapted to be coupled to the ignition circuit and the starter circuit;

an exhaust fan coupled to said safety control module; and a vapor sensor coupled to said safety control module, said vapor sensor configured to be mounted within the engine compartment of the boat so as to detect fuel vapors; said vapor sensor including a temperature compensated wheatstone bridge, said bridge including a vapor sensing unit having a heater that is separated from a detector by a partition; and a voltage divider;

wherein said safety control module disables the starter circuit of the engine and enables said exhaust fan when the concentration of fuel vapors detected by said vapor sensor exceeds a predetermined threshold, while the safety control module maintains the operation of the ignition circuit of the engine, if the engine was operating at the time said predetermined threshold was exceeded.

2. The boat ignition safety apparatus of claim 1, further comprising:

a comparator having an inverting terminal and a non-inverting terminal, wherein the output of the vapor sensing unit is coupled to the inverting terminal of said comparator, while the non-inverting terminal is coupled to the voltage divider.

3. The boat ignition safety apparatus of claim 2, wherein said voltage divider comprises a plurality of resistors; and a thermistor in series with at least one said resistor.

4. A method for detecting fuel vapor in an engine compartment of a boat maintaining an engine, the method comprising:

placing an ignition switch into its ON position;

disabling a starter circuit, and an ignition circuit for a predetermined period of time;

determining whether said predetermined period of time has expired;

determining whether the fuel vapor concentration in the engine compartment exceeds a predetermined level once said predetermined period of time has expired;

enabling said starter circuit, and said ignition circuit if at said second determining step said fuel vapors do not exceed said predetermined level;

determining whether the fuel vapor level has increased above said predetermined level after the engine has been started;

determining whether the ignition switch has been turned off if the fuel vapor level has increased above said predetermined level; and starting a convenience timer and shutting the engine off if said ignition switch has been turned to its OFF position.

5. The method of detecting fuel vapor of claim 4, further comprising:

activating a vapor alarm after said placing step; and disabling said vapor alarm after the completion of said enabling step.

6. The method of detecting fuel vapor of claim 5, further comprising:

starting an exhaust fan after said placing step; and disabling said exhaust fan after the completion of said enabling step.

7. The method of detecting fuel vapor of claim 4, further comprising:

placing the ignition switch in its ON position;

determining whether said convenience timer has expired; and enabling the starter circuit if said convenience timer has not expired.

8. The method of detecting fuel vapor of claim 4, further comprising:

placing the ignition switch in its ON position;

determining whether said convenience timer has expired; and returning to said first disabling step if said convenience timer has expired.

9. The method of detecting fuel vapor of claim 4, further comprising:

disabling the starter circuit and enabling the ignition circuit so that the engine continues to operate if the concentration of fuel vapors increases above said predetermined level.

10. The method of detecting fuel vapor of claim 9, further comprising:

starting an exhaust fan after said disabling step.

11. A method of detecting fuel vapor in an engine compartment of a boat maintaining an engine, the method comprising:

placing an ignition switch into its ON position;

disabling a starter circuit, and an ignition circuit for a predetermined amount of time;

determining whether said predetermined period of time has expired;

determining whether the fuel vapor concentration in the engine compartment exceeds a predetermined level once said predetermined period of time has expired;

enabling said starter circuit, and said ignition circuit if at said second determining step said fuel vapors do not exceed said predetermined level;

determining whether the fuel vapor level has increased above a predetermined level after the engine has been started;

disabling the starter circuit and enabling the ignition circuit so that the engine continues to operate if the concentration of fuel vapors increases above said predetermined level;

disabling the engine;

starting a convenience timer if the engine has been disabled;

placing the ignition switch into its ON position;

determining whether said convenience timer has expired; and determining whether concentration of fuel vapors are above said predetermined level if said convenience timer has not expired; and disabling the starter for a predetermined period of time and starting an exhaust fan for a predetermined period of time if said convenience timer has expired.

12. The method of detecting fuel vapor of claim 11, further comprising:

enabling the starter circuit if the fuel vapors are not above said predetermined level.

13. The method of detecting fuel vapor of claim 11, further comprising:

disabling the starter circuit and starting and exhaust fan if the fuel vapors are above said predetermined level.

* * * * *